United States Patent
Kubota et al.

(10) Patent No.: US 10,525,853 B2
(45) Date of Patent: Jan. 7, 2020

(54) APPARATUS FOR RETURNING A STOW STRAP TO A RETAINED ACCESS POSITION

(71) Applicant: HONDA MOTOR CO., LTD., Tokyo (JP)

(72) Inventors: Yuji Kubota, Marysville, OH (US); Derek S. Lindsay, Marysville, OH (US); Ross L. Burghardt, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 15/913,399

(22) Filed: Mar. 6, 2018

(65) Prior Publication Data

US 2019/0275917 A1   Sep. 12, 2019

(51) Int. Cl.
*B60N 2/20* (2006.01)
*B60N 2/36* (2006.01)
*B60N 2/844* (2018.01)

(52) U.S. Cl.
CPC ............. *B60N 2/366* (2013.01); *B60N 2/206* (2013.01); *B60N 2/20* (2013.01); *B60N 2/844* (2018.02)

(58) Field of Classification Search
CPC ........... B60N 2/366; B60N 2/206; B60N 2/20
USPC ................. 297/378.12, 15; 296/65.01–65.18
See application file for complete search history.

(56) References Cited

U.S. PATENT DOCUMENTS

| | | | |
|---|---|---|---|
| 4,455,049 A * | 6/1984 | Martin | B60N 2/366 292/87 |
| 5,692,803 A | 12/1997 | Luik et al. | |
| 5,879,043 A | 3/1999 | Radue et al. | |
| 6,132,000 A | 10/2000 | Tanaka | |
| 7,152,921 B2 * | 12/2006 | Saberan | B60N 2/12 297/336 |
| 7,201,425 B2 * | 4/2007 | Tsujibayashi | B60N 2/01583 296/65.05 |
| 7,246,849 B2 | 7/2007 | Lewis | |
| 7,252,320 B2 * | 8/2007 | Tsujibayashi | B60N 2/01583 296/65.05 |
| 7,309,095 B2 | 12/2007 | O'Connor | |
| 7,806,480 B2 | 10/2010 | Wieclawski | |

(Continued)

FOREIGN PATENT DOCUMENTS

| | | |
|---|---|---|
| JP | H08-113068 A | 5/1996 |
| JP | 2003-170767 A | 6/2003 |

(Continued)

*Primary Examiner* — Syed A Islam
(74) *Attorney, Agent, or Firm* — Arent Fox LLP

(57) ABSTRACT

A method, apparatus, and system for retaining a stow strap is disclosed. The stow strap may be usable with a stowable automotive seat. A seat stowing mechanism may be housed at least partially within the inner portion of the seat. A stow strap may be interoperable with the seat stowing mechanism, wherein the stow strap passes from the inner seat to the outer rear seatback surface of the seat through an opening in the outer rear seatback of the seat. Pulling the stow strap imparts a force in a first direction on the seat stowing mechanism. A stow strap retaining mechanism may be spaced from the opening and may provide a reactive force in a return direction to return the stow strap toward the outer rear seatback surface when the stow strap is pulled away from the rear seatback surface.

20 Claims, 16 Drawing Sheets

(56) References Cited

U.S. PATENT DOCUMENTS

| | | | |
|---|---|---|---|
| 7,959,230 B2 * | 6/2011 | Hentges | B60N 2/3011 297/378.12 |
| 8,047,614 B2 * | 11/2011 | Goshima | B60N 2/366 296/65.16 |
| 8,191,968 B2 | 6/2012 | Hazlewood | |
| 8,235,446 B2 * | 8/2012 | Aoki | B60N 2/3079 296/65.09 |
| 8,282,150 B2 * | 10/2012 | Clor | B60N 2/3011 296/65.09 |
| 8,287,024 B2 * | 10/2012 | Sayama | B60N 2/3011 296/65.03 |
| 8,287,037 B2 * | 10/2012 | Sayama | B60N 2/01583 297/15 |
| 8,328,284 B2 * | 12/2012 | Loomis | A47C 7/407 297/378.12 |
| 8,459,731 B2 * | 6/2013 | Runde | B60N 2/856 297/61 |
| 8,845,019 B2 * | 9/2014 | Sawada | B60N 2/20 297/216.1 |
| 8,888,186 B2 * | 11/2014 | Otsuka | B60N 2/22 297/378.12 |
| 8,926,007 B2 * | 1/2015 | Sayama | B60N 2/01583 297/15 |
| 8,985,692 B2 * | 3/2015 | Pacolt | B60N 2/20 296/65.05 |
| 9,162,591 B2 | 10/2015 | Tame et al. | |
| 9,809,135 B2 * | 11/2017 | Elton | B60N 2/933 |
| 2005/0012379 A1 | 1/2005 | Tame | |
| 2006/0097559 A1 | 5/2006 | Lewis | |
| 2008/0296951 A1 | 12/2008 | Goshima et al. | |
| 2011/0115274 A1 * | 5/2011 | Hazlewood | B60N 2/12 297/378.12 |
| 2012/0025557 A1 | 2/2012 | Lindsay et al. | |
| 2012/0261964 A1 * | 10/2012 | Yamaguchi | B60N 2/12 297/378.14 |

FOREIGN PATENT DOCUMENTS

| | | |
|---|---|---|
| JP | 2009-161154 A | 7/2009 |
| JP | 57500038 B2 | 5/2015 |

* cited by examiner

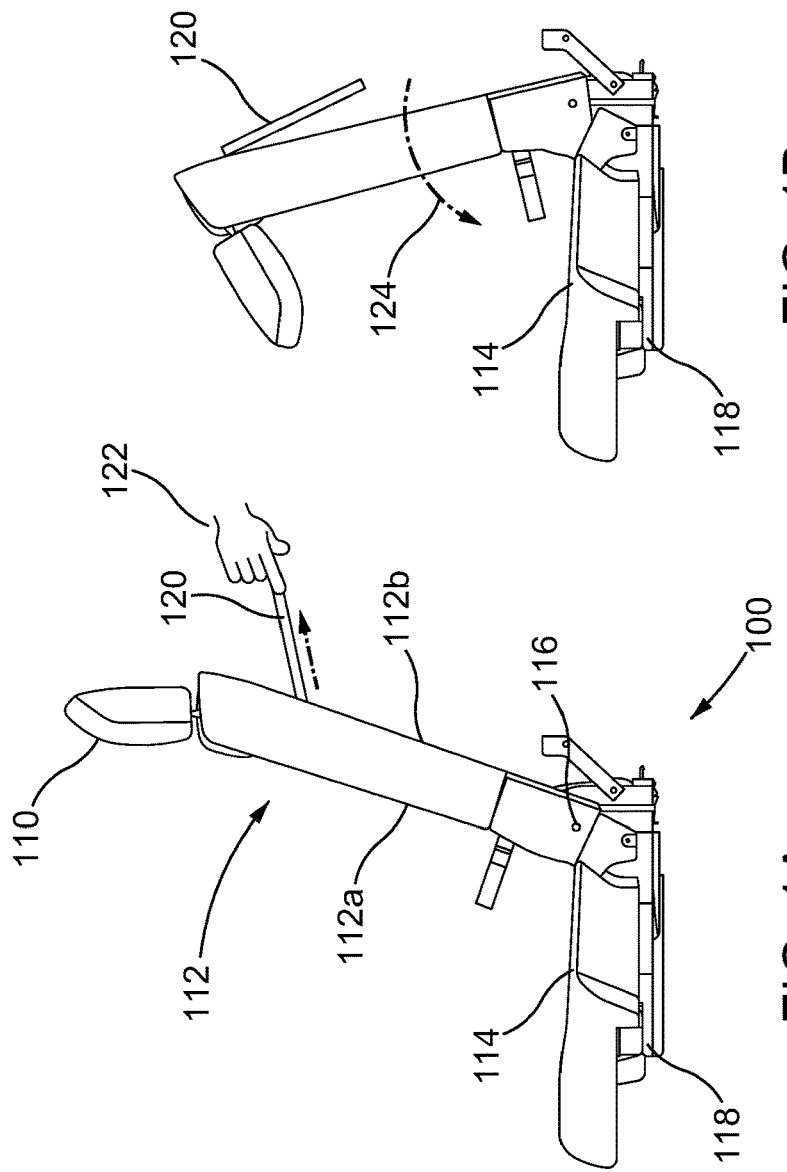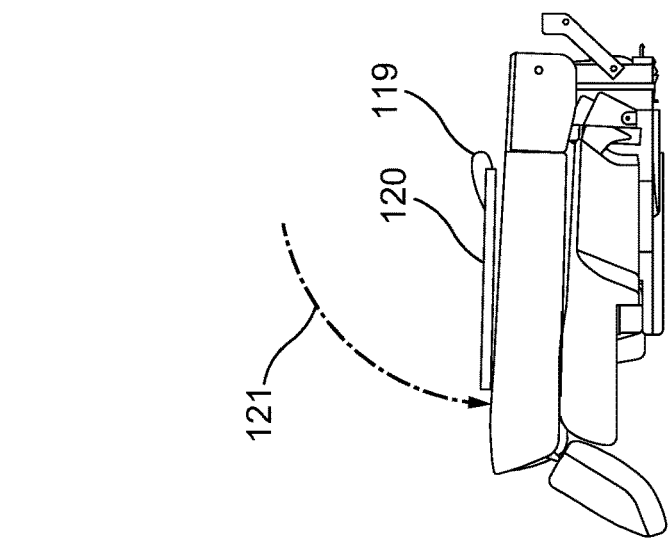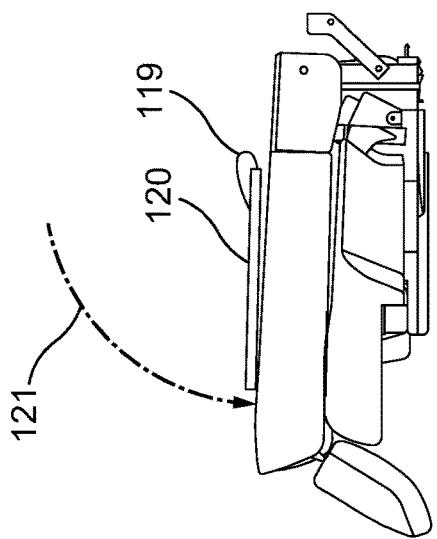

APPARATUS FOR RETURNING A STOW STRAP TO A RETAINED ACCESS POSITION

FIELD OF THE INVENTION

Aspects of the present disclosure relate generally to an apparatus and methods for retaining a stow strap to seatback.

BACKGROUND

Most modern vehicles have seat assemblies having a recliner or release mechanism to pivotally move a seatback from a seated position to a stowed and/or fold flat position. The stowed position allows a vehicle user to increase the storage space available in the rear of a vehicle and/or may allow access to a third row seating in vans, minivans, or sports utility vehicles (SUVs). In some vehicles, a strap is provided to release the recliner or release mechanism.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure relate to methods and apparatuses for containing a release strap and/or stow strap usable with a foldable or stowable automotive seat. In accordance with one aspect of the disclosure, an apparatus for containing a stow strap is disclosed. The stow strap retaining mechanism may include a retention sleeve having a channel extending from an opening at a first end of the retention sleeve to a second opening at a second end of the retention sleeve. The channel may be configured to receive and guide a stow strap. The apparatus may further include a retention sleeve track extending along a first direction. The retention sleeve may be pivotally mounted to the retention sleeve track at a pivot location. The apparatus may further include a biasing element, wherein the biasing element biases the retention sleeve to pivot in a first direction towards the retention sleeve track.

In accordance with another aspect of the disclosure a stowable automotive seat is disclosed. The stowable seat may include a seat, an outer front seatback surface, an outer rear seatback surface, and an inner seat between the front seatback surface and the rear seatback surface. A seat stowing mechanism may be housed at least partially within the inner seat. A stow strap may be interoperable with the seat stowing mechanism, wherein the stow strap passes from the inner seat to the outer rear seatback surface of the seat through an opening in the outer rear seatback of the seat. Pulling the stow strap may impart a force in a first direction on the seat stowing mechanism. A stow strap retaining mechanism may be spaced from the opening and may provide a reactive force in a return direction to return the stow strap toward the outer rear seatback surface when the stow strap is pulled away from the rear seatback surface.

In accordance with another aspect of the disclosure, a stowable automotive seat having a retention mechanism is disclosed. The stowable seat may include a seat, an outer front seatback surface, an outer rear seatback surface, and an inner seat between the front seatback surface and the rear seatback surface. A seat stowing mechanism may be housed at least partially within the inner seat. A stow strap may be interoperable with the seat stowing mechanism, wherein the stow strap passes from the inner seat to the outer rear seatback surface of the seat through an opening in the outer rear seatback of the seat. Pulling the stow strap may impart a force in a first direction on the seat stowing mechanism. The seat may further include a stow strap retention mechanism. The stow strap retaining mechanism may include a retention sleeve having a channel extending from an opening at a first end of the retention sleeve to a second opening at a second end of the retention sleeve. The channel may be configured to receive and guide a stow strap. The apparatus may further include a retention sleeve track extending along a first direction. The retention sleeve may be pivotally mounted to the retention sleeve track at a pivot location. The apparatus may further include a biasing element, wherein the biasing element biases the retention sleeve to pivot in a first direction towards the retention sleeve track.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIGS. 1A-C are side views of one example of a seat that may be folded in accordance with an aspect of the disclosure;

DETAILED DESCRIPTION

The following includes definitions of selected terms employed herein. The definitions include various examples and/or forms of components that fall within the scope of a term and that may be used for implementation. The examples are not intended to be limiting.

Example aspects of a system in accordance with aspects of the present disclosure are described throughout the specification. In the interest of clarity, not all features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 3:
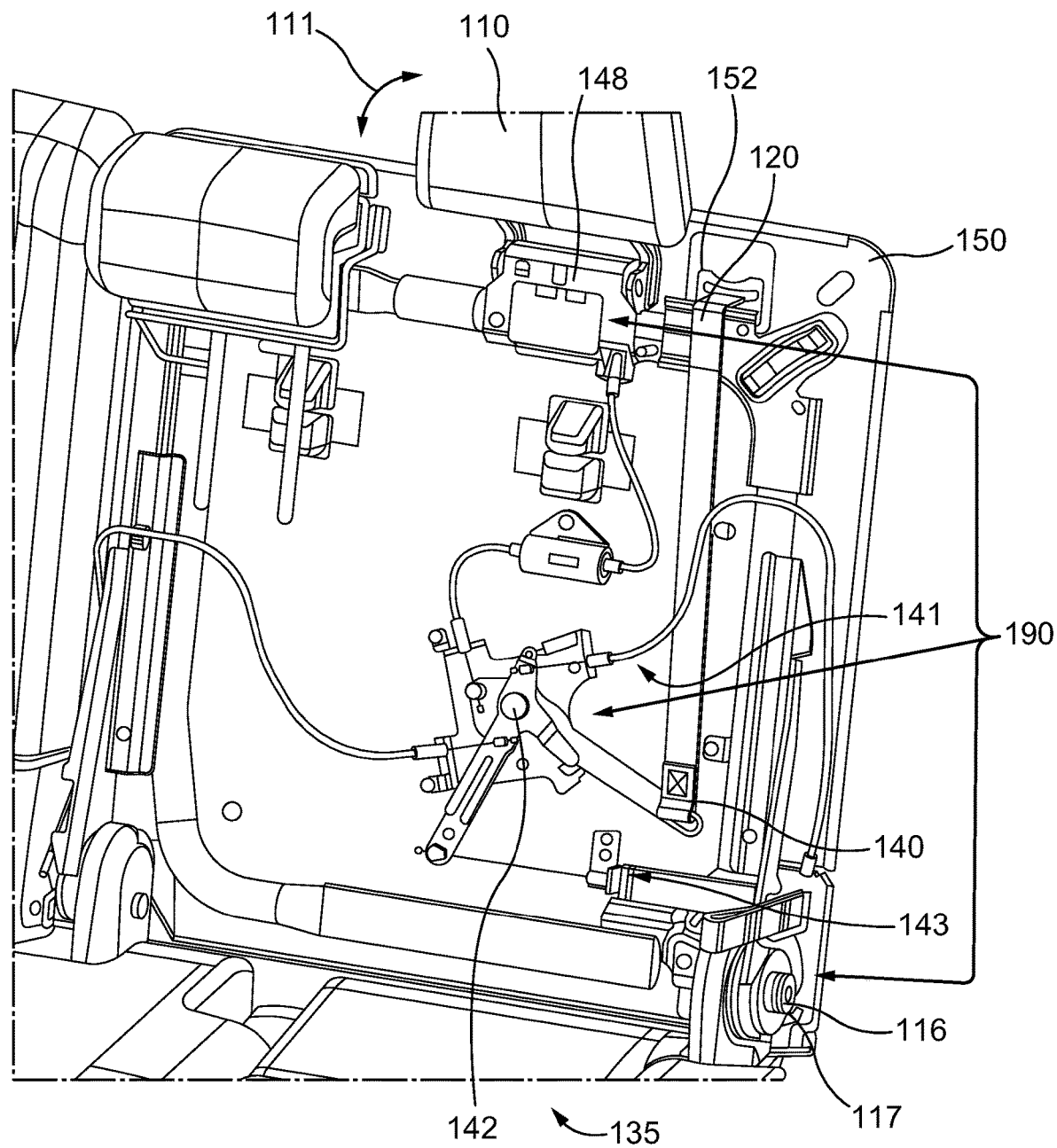
FIG. 3 is a see-through side perspective view of a seatback in in accordance with an aspect of the disclosure.

FIGS. 1A-C illustrate one aspect of a vehicle seat 100 that may include a recliner or release mechanism that may enable a seatback 112 to be pivotally moved from a seated position (FIG. 1A) to a stowed and/or fold flat position (FIG. 1C). The seat 100 may include a headrest 110, a seatback 112 having a front surface 112a and a seatback rear surface 112b and a seat bottom 114. The seatback 112 may be connected to a seatframe 118, and the seatback 112 may be pivotable about a pivot point 116. The headrest 110 may also be pivotable with respect to the seatback 112. The seat 100 may further comprise a series of components that make up the seat stow mechanism 190. The seat stow mechanism 190 is best illustrated with reference to FIG. 3. Either the seatback 112 and/or the headrest 110 may pivot in response to the release of a seat stow mechanism 190 (FIG. 3). The seat stow mechanism may release at least one of the seatback 112 or the headrest 110 in response to the pulling of a stow strap 120, such as by a user's hand 122. As shown in FIGS. 1B and 10, pulling the stow strap 120 may result in the seat 100 being pivotable and/or automatically pivoting to an intermediate position as shown in FIG. 1B and/or a fully stowed position as shown in FIG. 10.

Figure 2B:
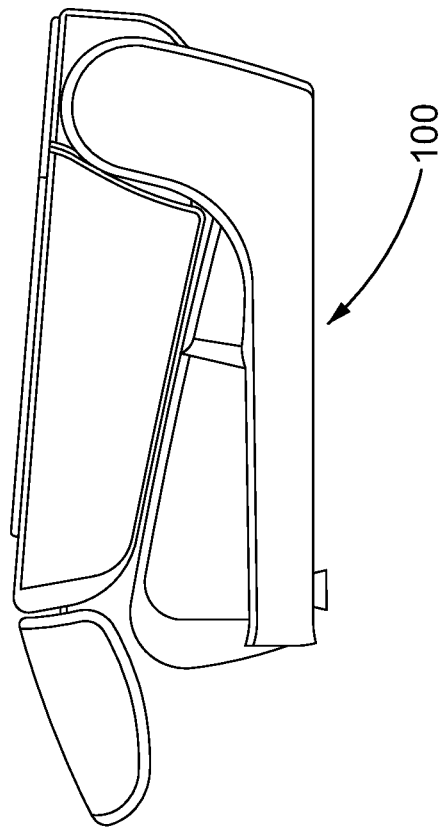
FIGS. 2A-B are side views of a folded seat and the position of a seat stow strap in accordance with an aspect of the disclosure.
Figure 2A:
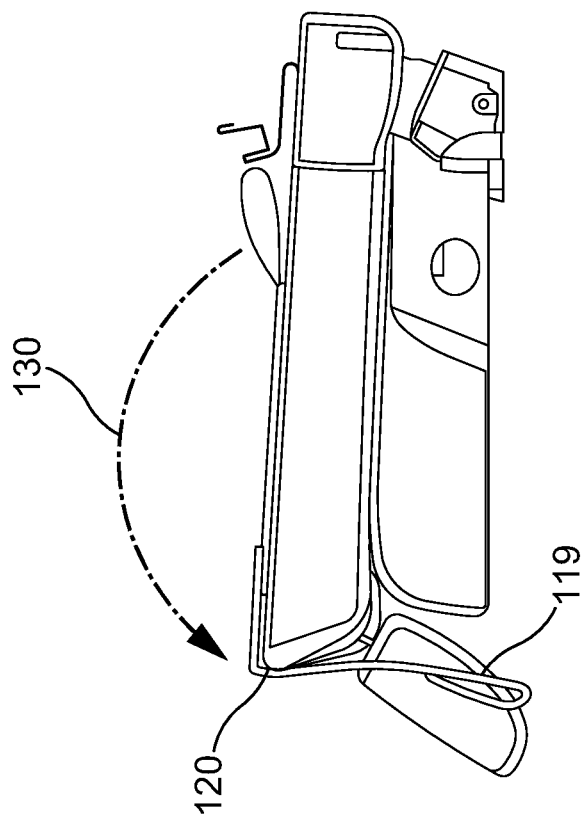

As shown in FIGS. 2A-B, when the stow strap 120 is pulled to release the seat stow mechanism, the seat 100 may pivot either automatically or by a user pressing the seat 100 into the fully stowed position as shown. When a seat 100 is moved to the fully stowed position, stow strap 120 may fall forward in direction 130 (FIG. 2B) resulting in a user being unable to reach the stow strap 120 and/or the stow strap loop 119. Accordingly, in accordance with aspects of the current disclosure, various methods and apparatuses that may be usable to retain a stow strap at a desired location are disclosed. While throughout the disclosure, a stow strap may be referenced as being retained to a certain location of the seat using the methods and apparatuses disclosed throughout the specification, it is noted that the locations of the stow strap shown are only intended to represent examples. Accordingly, the methods and aspects disclosed herein are applicable to stow straps that may be desired to be retained at any location on a seat and/or near a seat. Further, reference may be made to the spatial relationships among various components and to the spatial orientation of various aspects of components as the devices are depicted in the figures referenced throughout the specification. However, as will be recognized by those skilled in the art after a complete reading of the present application, the devices, members, apparatuses, etc., described herein may be positioned in any suitable orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any suitable direction.

FIG. 3 is an example see-through view showing an inner seatback 135. The inner seatback 135 and seat stow mechanism 190 described in relation thereto in FIG. 3 may be applicable to and usable with the stow strap and stow strap retention mechanisms discussed throughout the specification. Each of the aspects disclosed throughout the specification may be combined or substituted with a similar component described herein. Further, it is noted that the various features of the inner seatback 135 shown in FIG. 3 are only examples. Accordingly, the disclosure is applicable to any seat mechanism that may be engaged and/or released using a cord, rope, strap, or stow strap, for example.

The inner seatback 135 may include a seatback frame 150. The seatback frame 150 may have mounted thereto a seat stowing mechanism. The seat stowing mechanism may include a headrest folding mechanism 148. The headrest folding mechanism may be connected to headrest 110. The headrest folding mechanism 148 may allow headrest 110 to pivot in direction 111 relative to mechanism 148. The inner seatback 135 may also include a seatback fold mechanism 117 that may be near pivot point 116. Either one of or both of the headrest folding mechanism 148 and the seatback fold mechanism 117 may interoperable with a stow strap force retracting mechanism 142. The stow strap force retracting mechanism 142 may receive a force (e.g., pull by a user) applied to a stow strap 120 attached to the mechanism 142 at connection point 140. For example, the stow strap force retracting mechanism 142 may be configured to be biased so as to provide or impart a reaction force in the direction represented by arrow 143. The stow strap 120 may pass from the inner seatback to an outer seatback (e.g., the rear surface of the seatback) through an opening 152. A user may grasp the stow strap at a location external to the inner seatback 135 and pull the strap to extend the stow strap from an interior portion of the seatback through the opening in the outer surface of the seatback to a seat stowed portion length. When the stow strap is extended to a seat stowed portion length, the stow strap imparts a force in direction 141 thereby imparting a force on stow strap force retracting mechanism 142. Once a stow strap 120 is pulled by a user so as to overcome the bias or reactive force in the direction of arrow 143, the force retracting mechanism 142 may pivot toward direction 141, which in turn may result in either one of or both of the headrest folding mechanism 148 and the seatback fold mechanism 117 releasing, so as to allow the folding of either one of or both of the headrest 110 or the seatback. Once the user releases or removes the force from the stow strap, the stow strap force retracting mechanism 142 imparts a force in direction of arrow 143 causing the stow strap 120 to retract to a seat unstowed portion length. Once the seatback and/or headrest 110 is in the folded and/or stowed position, the stow strap 120 may also be used to pull the seatback to an upright position (e.g., as shown in FIG. 1A). Further, the stow strap force retracting mechanism 142 may be configured so that pulling the stow strap 120 and returning the seatback and/or headrest 110 to the upright position results in the locking of the seat and/or headrest 110 in the upright position. In another aspect, the headrest folding mechanism 148 may cause the headrest 110 to release and pivotally fold toward the mechanism 148 when a stow strap 120 is pulled and the seatback is folded to a stowed position. The headrest folding mechanism 148 may also cause the headrest 110 to automatically rise to an upright position when the seatback is raised again to the upright position.

Figure 4A:
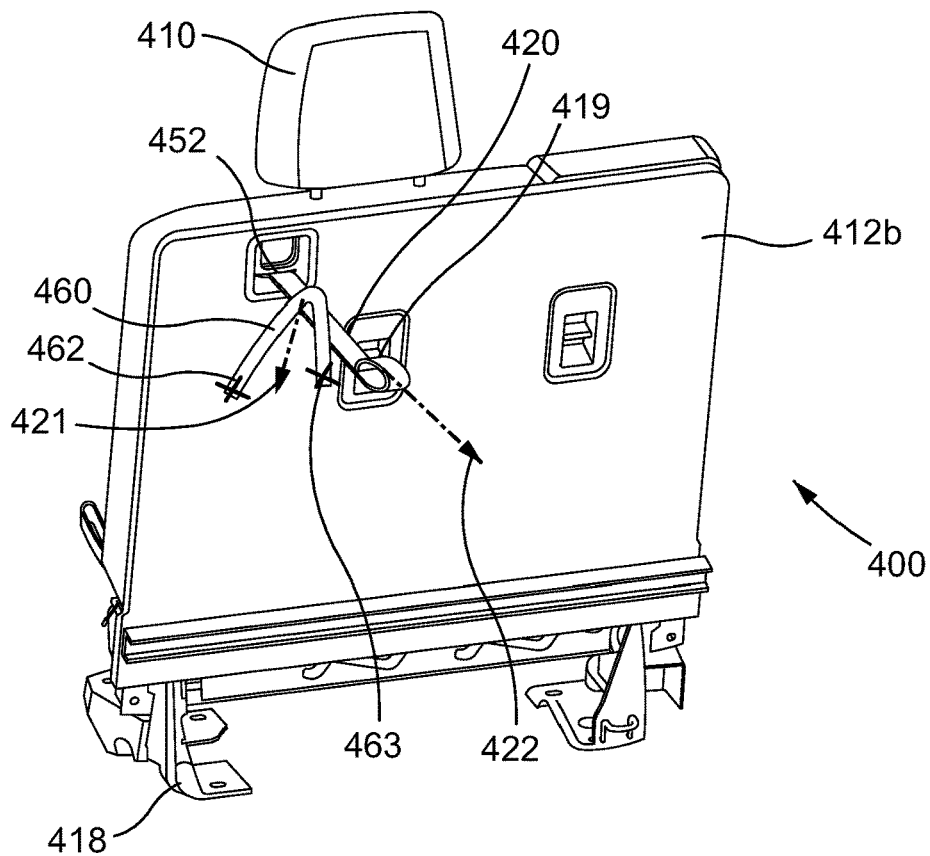
FIG. 4A is a side perspective view of a seatback and stow strap retention mechanism in accordance with one aspect of the disclosure.
Figure 4B:
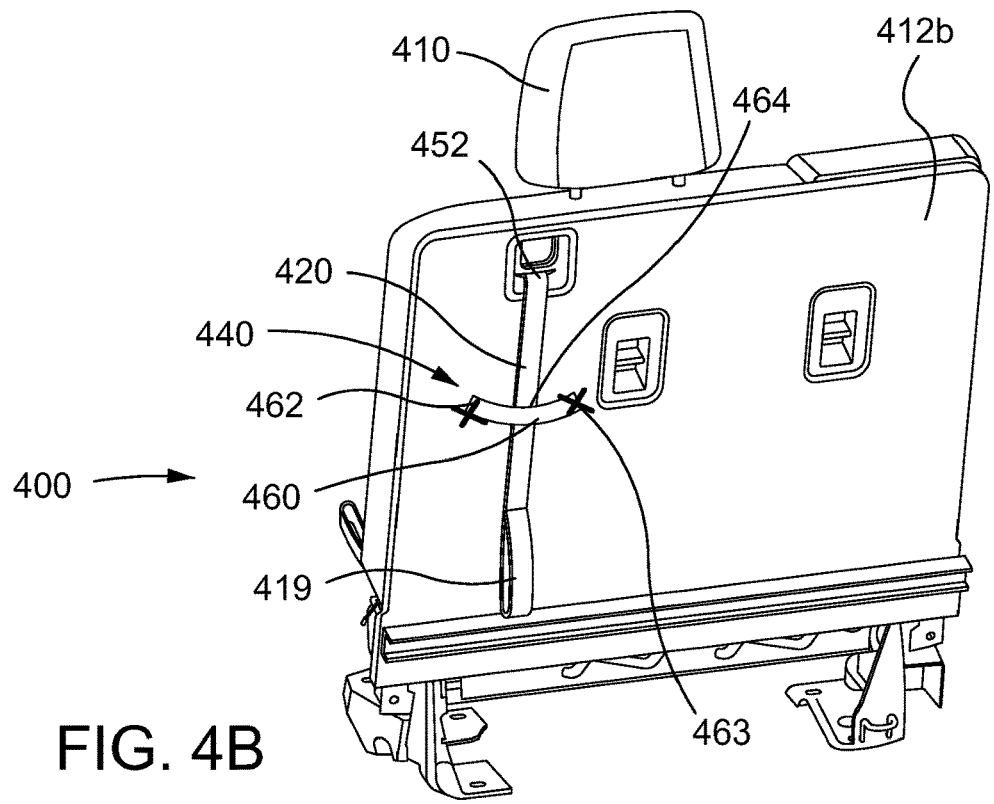
FIG. 4B is a side perspective view of a seatback and the stow the stow strap retention mechanism shown in FIG. 4A in accordance with one aspect of the disclosure.

FIGS. 4A-B show a side perspective views of a seatback and examples of stow strap features and operation in accordance with one aspect of the disclosure. A stow strap retention feature 440 may comprise an elastic material portion (e.g., elastic band) 460 having first and second ends extending between connection points 462 and 463, respectively, on seatback rear surface 412b. The first and second ends may be connected to the outer seatback and/or seatback frame 150 (FIG. 3) using any suitable features and/or methods. For example, the first and second ends may be riveted, sewed, bolted, screwed, welded using ultrasonic welding and/or friction welding, or connected using any suitable method for connecting the strap to the seatback rear surface 412b at connection points 462 and 463. As another example, the elastic material portion 460 may, instead of being attached at points 462 and 463, comprise a loop that passes through the seatback rear surface 412b and/or seatback frame 150 (FIG. 3) through openings at each of the points 462 and 463.

A stow strap 420 may extend through the passage space 464 encompassed by the elastic material portion 460 and the seatback rear surface 412b of the seat 416. As shown in FIG. 4A, the elastic band 460 may stretch during pull (e.g., via loop 419) of stow strap 420. When the stow strap is pulled in direction 422, for example, the elastic band 460 may stretch and thereby impart a reactive force in direction 421 on the strap 420. When the pulling force is released, the elastic band may contract in direction 421 with the stow strap 420 being retained therebeneath and returning to a rest position as shown in FIG. 4B. In the rest position of FIG. 4B, stow strap 420 is held against seatback rear surface 412b via elastic band 460. Accordingly, the stow strap 420 returns to substantially the same position after operation of stowing or unstowing of the seatback 412 or headrest 410 is completed.

Figure 4C:
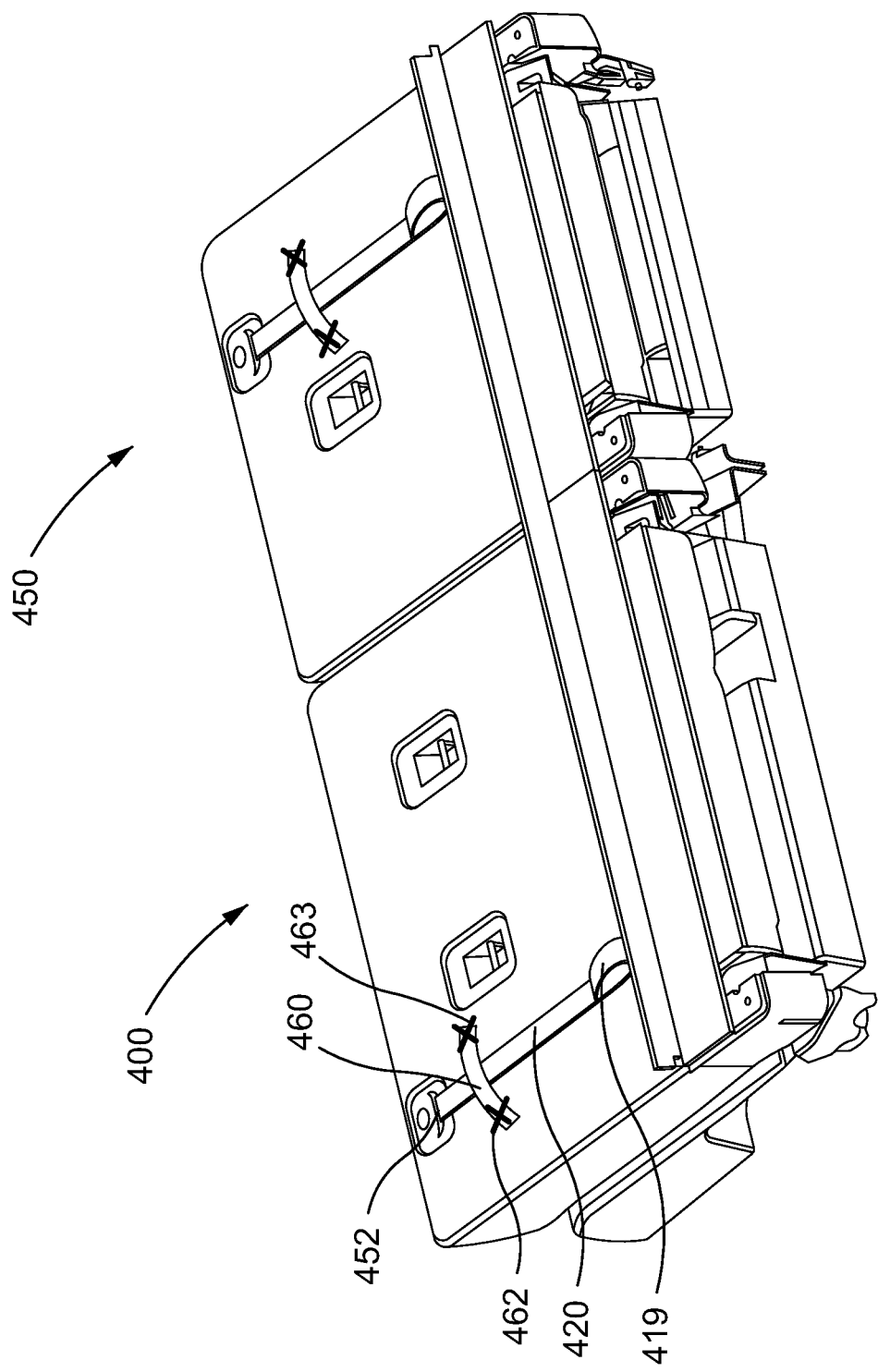
FIG. 4C is a side perspective view of a folded seat with the stow strap and stow strap retention mechanism shown in FIGS. 4A-B in accordance with one aspect of the disclosure.

FIG. 4C is a side perspective view of a folded seat, that may include a first split seat portion 400 and a second split seat portion 450. Each of the seat portions 400, 450 may have a stow strap 420 and stow strap retention feature 440 similar to as shown and described with respect to FIGS. 4A and 4B. As shown in FIG. 4C, when seat portions 400 and 450 are in a stowed or folded position, the stow strap retention feature 440 may retain the stow strap 420 in position against the seatback rear surface.

Figure 5A:
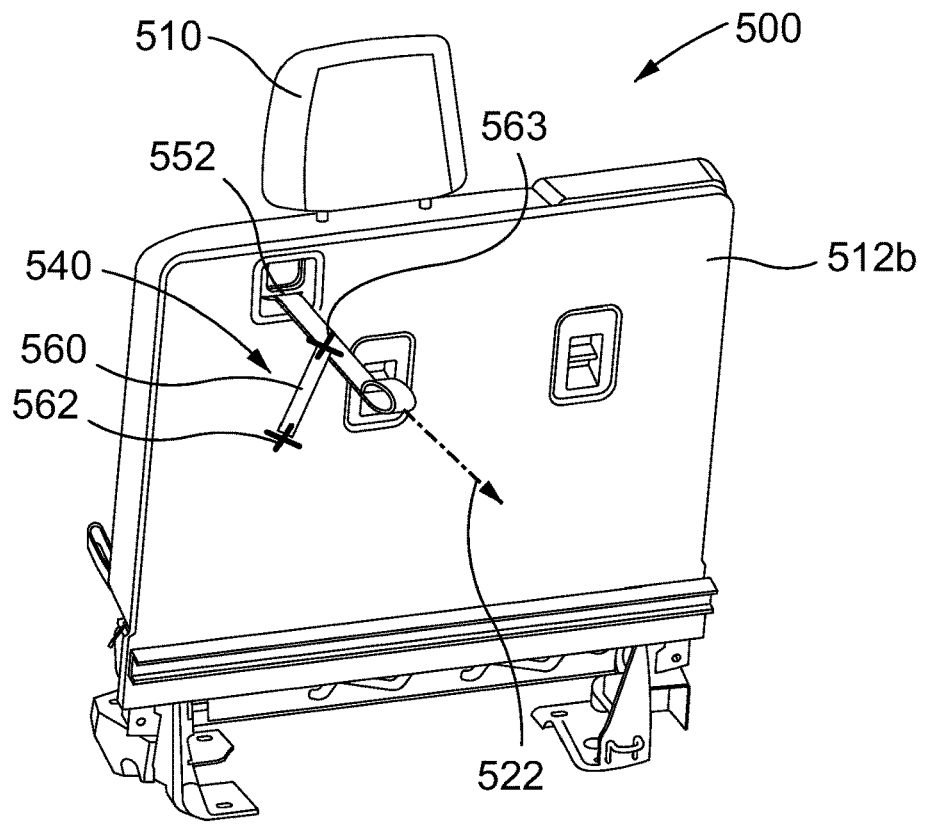
FIG. 5A is a perspective view of a seatback and stow strap retention mechanism in accordance with one aspect of the disclosure.
Figure 5B:
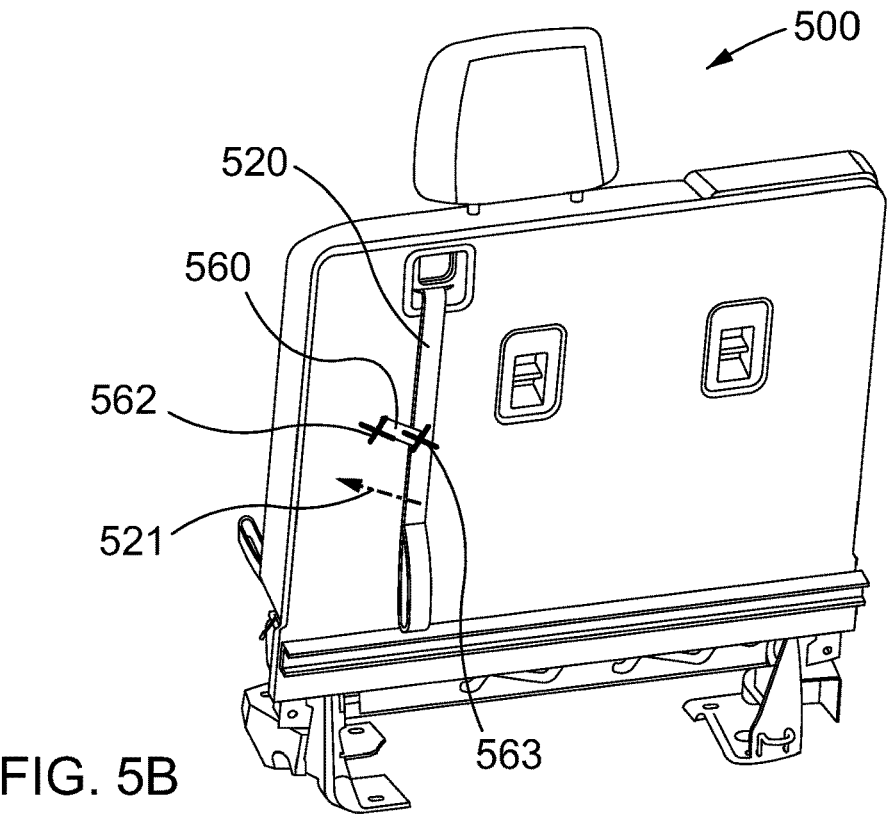
FIG. 5B is a perspective view of a seatback and the stow the stow strap retention mechanism shown in FIG. 5A in accordance with one aspect of the disclosure.

FIGS. 5A and 5B show perspective views of a seatback and another example of stow strap retention feature in accordance with aspects of the disclosure. The stow strap retention feature may comprise an elastic material 560 having a first end that may be connected to a seatback surface at connection point 562 and a second end connected to the stow strap at a second connection point 563. For example, the first and/or second ends may be riveted, sewed, bolted, screwed, welded using ultrasonic welding and/or friction welding, or any suitable method for connecting the elastic material 560 at connection points 562 and 563. As shown in FIG. 5A, the elastic material 560 may stretch to allow pull of stow strap 520. When stow strap 520 is pulled in direction 522, for example, as shown in FIG. 5B, the elastic material 560 may stretch and thereby imparts a reactive force in direction 521, without preventing pull of strap 520 in direction 522. When strap 520 is released, the elastic material may contract in direction 521, causing the stow strap 520 to return to the rest position show in FIG. 5B. In the rest position of FIG. 5B, the stow strap 520 may be retained against or near seatback surface 512B.

Figure 5C:
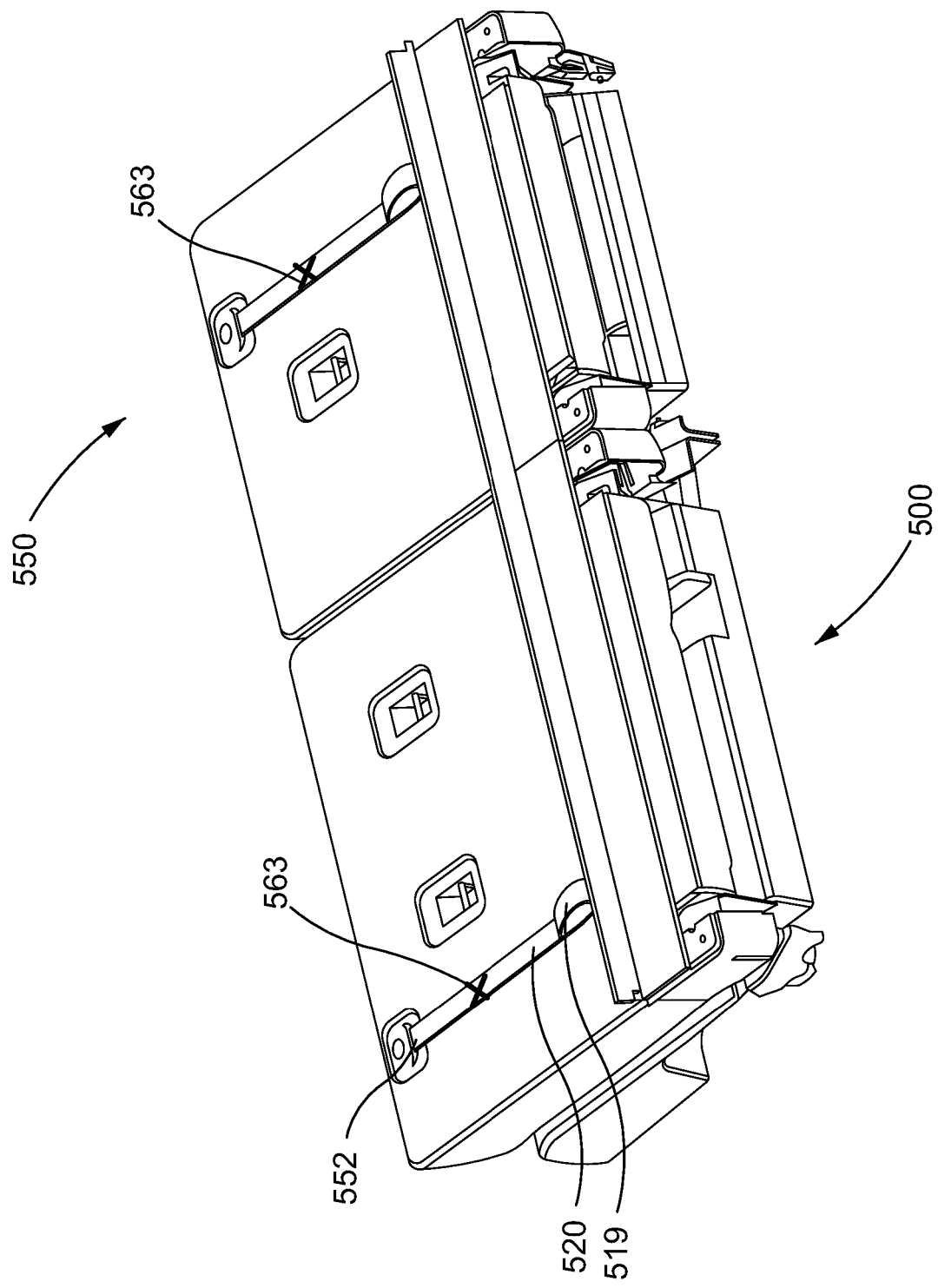
FIG. 5C is a side perspective view of a folded seat with the stow strap and stow strap retention mechanism shown in FIGS. 5A-B in accordance with one aspect of the disclosure.

FIG. 5C is a perspective view of a folded seat, which may have a first split seat portion 500 and a second split seat portion 550. Each of the seat portions 500, 550 may have a stow strap 520 and a stow strap retention feature operable with the stow strap 520 at connection point 563 as further shown and described with regard to FIGS. 5A and 5B. As shown in FIG. 5C, when seat portions 500 and 550 are in a stowed or folded position, the stow strap retention feature 540 may retain the stow strap 520 against the seatback rear surface.

Figure 6A:
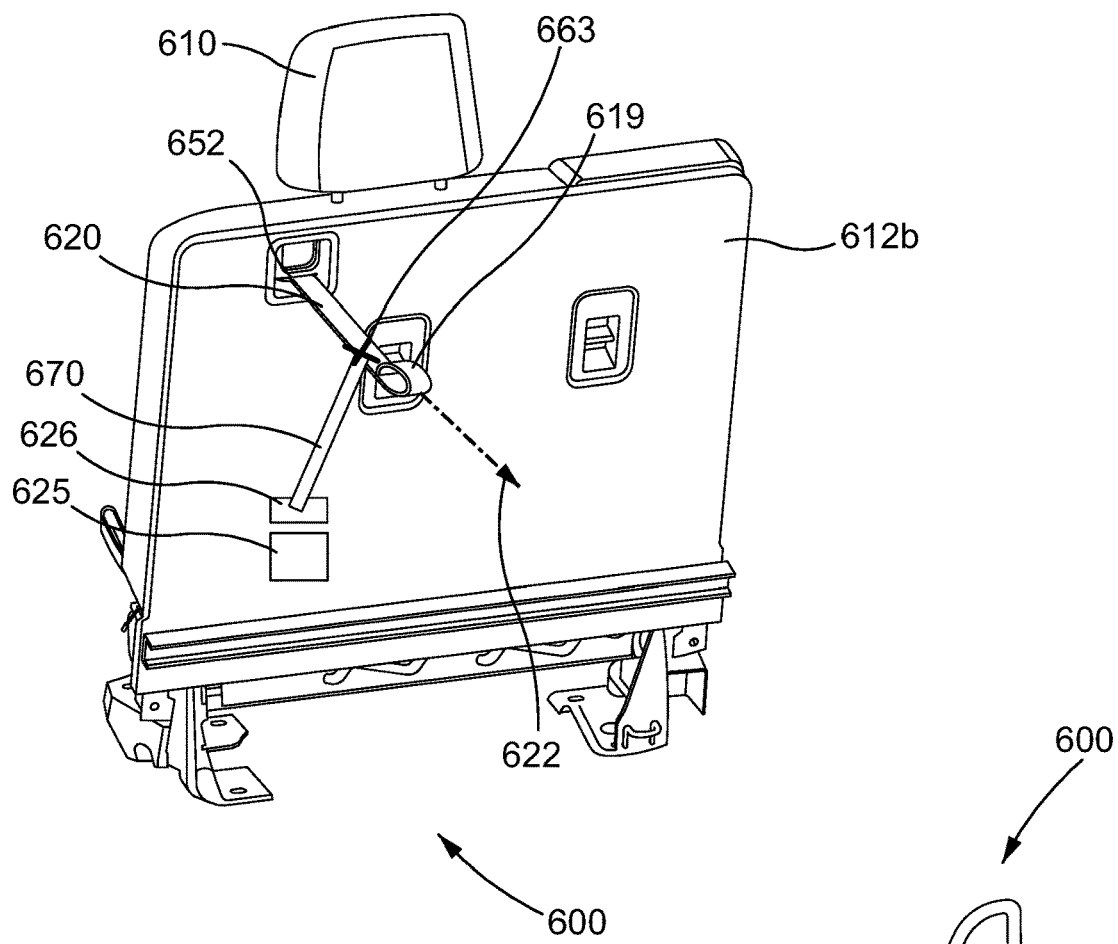
FIG. 6A is a side perspective view of a seatback and stow strap retention mechanism in accordance with one aspect of the disclosure.
Figure 6B:
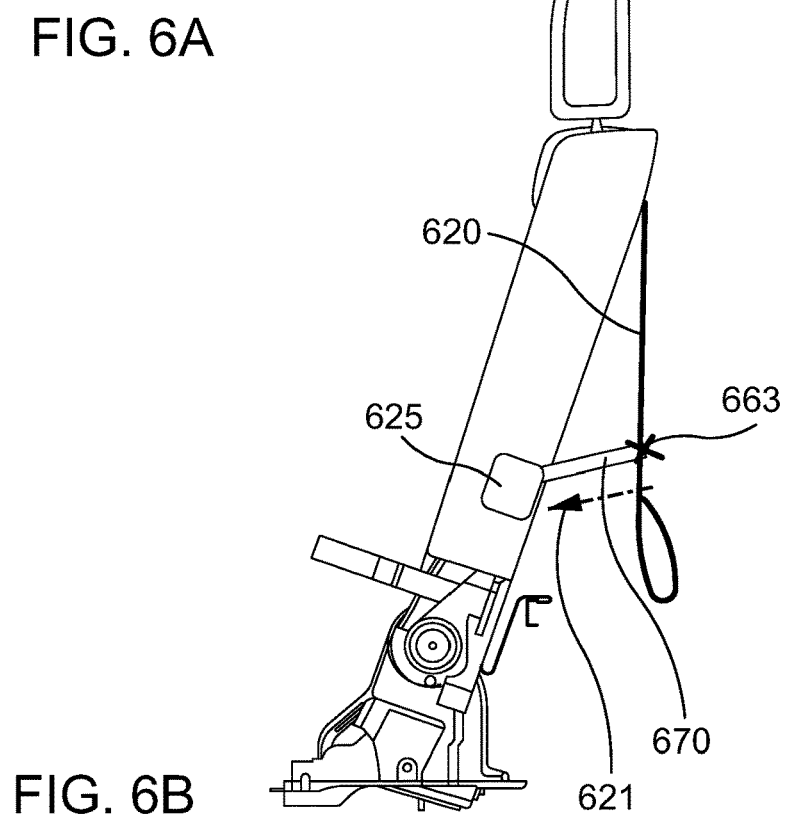
FIG. 6B is a side view of a seatback and the stow the stow strap retention mechanism shown in FIG. 6A in accordance with one aspect of the disclosure.

FIGS. 6A and 6B show a perspective partial see-through view and a side partial see-through view of a seatback 612 and one example of a stow strap retention feature in accordance with one aspect of the disclosure. The stow strap retention feature may include a retracting strap retention mechanism 625 located within in the inner seat behind seatback rear surface 612b. The retracting strap retention mechanism 625 may be connected to the seatback rear surface 612b and/or seatback frame 150 (FIG. 3). One example of various retraction features usable with the example of FIGS. 6A and 6B is further detailed with reference to FIG. 7. The seatback retraction feature may include a retaining strap 670. The retaining strap 670 may pass through the seatback rear surface 612b through opening 626, for example. The retaining strap 670 may have a first end connected to the retracting strap retention mechanism 625 via opening 626. The second end of the retaining strap 670 may be connected to the stow strap 620 at connection point 663, for example. The second end of the retaining strap 670 may be connected to the stow strap 620 using any suitable features and/or methods. As shown in FIG. 6B, the retaining strap 670 may retract into opening 626 via the retracting strap retention mechanism 625. In operation, a user may initiate retraction of the seatback 612 and/or the headrest 610, for example, by overcoming the retraction force of a retracting mechanism housed within the seatback 612 (see, e.g., stow strap force retracting mechanism 142 of FIG. 3). Accordingly, when a user pulls stow strap 620 in direction 622, as shown in FIG. 6A, for example, the retracting strap retention mechanism 625 may impart a reactive force on the stow strap 620 via retaining strap 670 attached at point 663, without preventing a user from applying a sufficient pulling force to enable stowing of seatback 612 and/or headrest 610. When the pulling force on stow strap 620 is no longer applied, the stow strap 620 may be retracted via the stow strap retraction mechanism located within the seatback 612 (via opening 652), while the retaining strap 670 may also retract via retracting strap retention mechanism 625 in direction 621 causing the stow strap 620 upon retraction to return to a rest position against the seatback rear surface 612a.

Figure 7:
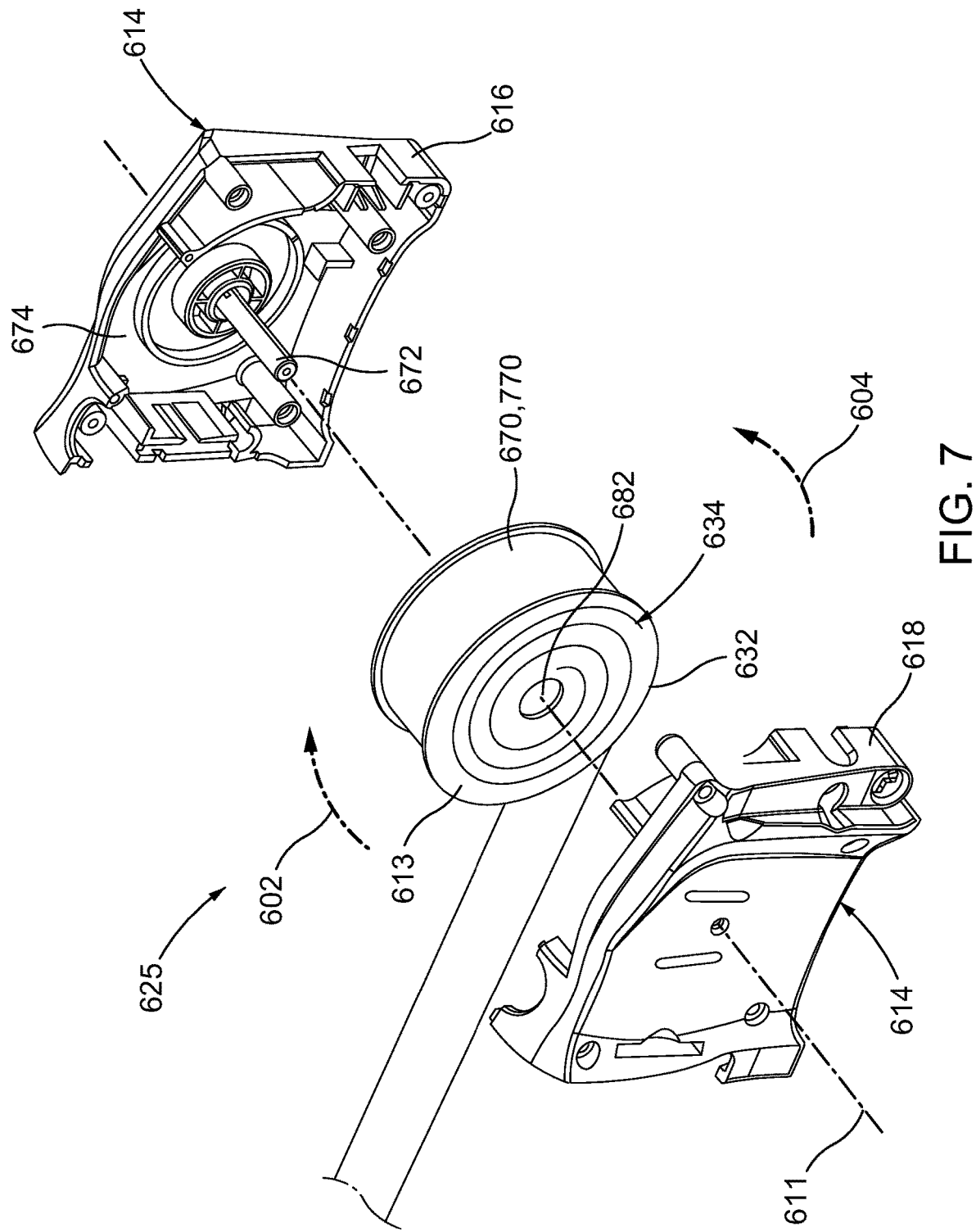
FIG. 7 is an exploded view of an example retracting retention mechanism for use in accordance with one aspect of the disclosure.

FIG. 7 shows an exploded view of an example stow strap retention mechanism 625 usable in accordance with aspects of the present disclosure. As shown in FIG. 7, the stow strap retention mechanism 625 may include a retractable strap reel 613, which may be cylindrical as shown in this example, disposed within a housing 614. In the example shown in FIG. 7, the housing 614 includes two housing halves 616 and 618. A retractable strap reel 613 may have an axial opening 682 extending through the center thereof. The opening 682 may allow the retractable strap reel to be rotatably mounted on shaft 672 that extends from an inner wall 674 of a first one of the housing halves 616, for example. The retractable strap reel 613 may also have a spring mechanism 632 incorporated therewith so as to bias the reel 613 to a strap retaining position. In this example, the spring mechanism 632 includes a coiled flat spring 634. A retaining strap 670 may be attached to and coned about the retractable strap reel 613, for example. The retaining strap 670 may be unwound and wound about the reel 613 between an extended position and a retracted position. In the extended position the retaining strap 670 may be extended substantially outside of the housing 614. In the retracted position, the retaining strap 670 may be substantially coiled about retractable strap reel 613 and primarily retained within the housing 614. In operation, the retractable strap reel 613 may rotate about an axis of rotation 611 when the retaining strap 670 is unwound and wound between the extended and retracted positions. The axis of rotation 611 may be substantially coaxial with the longitudinal axis of shaft 672. The retaining strap 670 may rotate in the direction indicated by arrow 602, for example, when the retaining strap 670 is unwound towards the extended position. The retaining strap 670 and retractable strap reel 613 may rotate in the direction indicated by arrow 604 when the retaining strap 670 is windably retracted. The spring mechanism 632 may bias the retractable strap reel 613 to rotate in the direction indicated by arrow 604, to maintain the retaining strap 670 in the wound or retracted position.

Figure 8A:
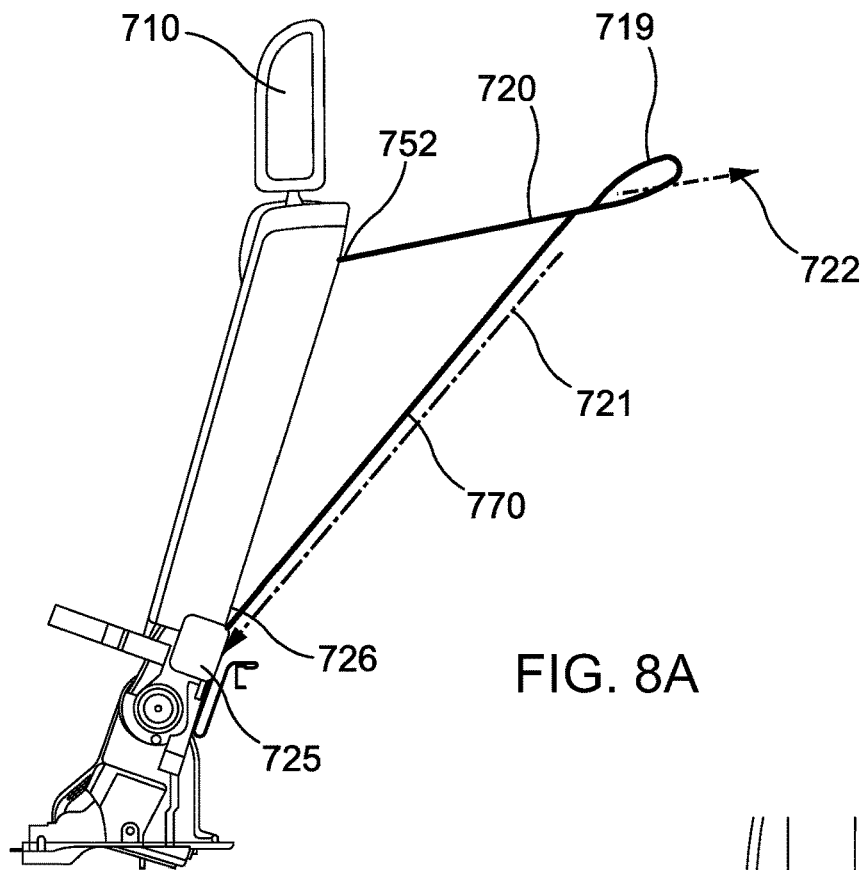
FIG. 8A is a side partial see-through view of a seatback and stow strap retention mechanism in accordance with one aspect of the disclosure.
Figure 8B:
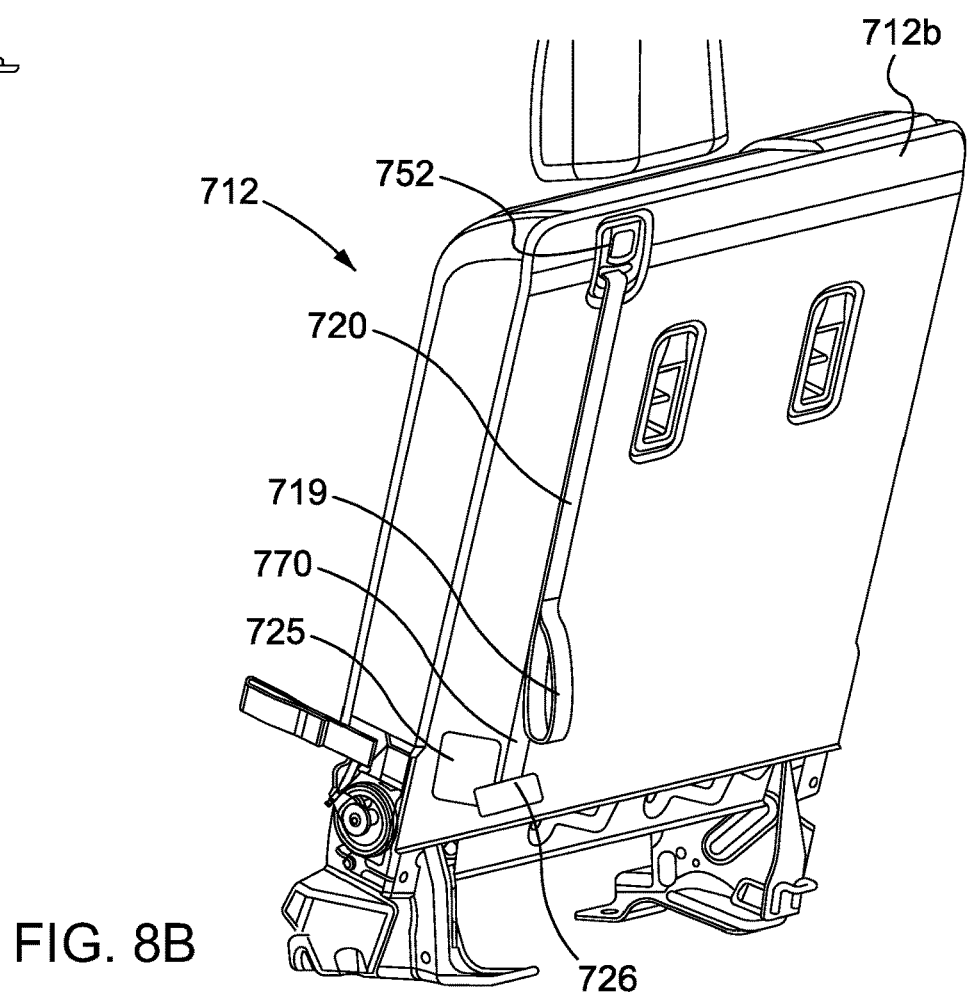
FIG. 8B is a side perspective view of a seatback and the stow the stow strap retention mechanism shown in FIG. 8A in accordance with one aspect of the disclosure.

FIGS. 8A and 8B show a side perspective partial see-through view and a side partial see-through view of a seatback and one example of a stow strap features and operation in accordance with one aspect of the disclosure. The stow strap retention mechanism may be comprised of a retraction mechanism 725 within in the inner seat behind seatback rear surface 712b or at the seat pivot 116 (FIG. 3). The retraction mechanism may be comprised of the retraction mechanism detailed with reference to FIG. 7 above, for example. The retraction mechanism 725 may be connected to the inner seatback and/or seatback frame 150 (FIG. 3). The seatback retraction mechanism may have a retaining strap 770 connected thereto. The retaining strap 770 may pass through the seatback rear surface 712b through opening 726. In one example, the retraining strap may be formed as a single strap with stow strap 720. A first end of the retaining strap 770 may be connected to the retraction mechanism 725 via opening 726. The second end of the retaining strap 770 may be formed as a single strap with and/or connected to stow strap loop 719. As an alternative, the second end of the retaining strap 770 may be connected to the stow strap 720 using any suitable features and/or methods. For example, the second end may be riveted, sewed, bolted, screwed, welded using ultrasonic welding and/or friction welding, or any other suitable method for connecting the retaining strap 770 to the stow strap near loop 719.

As shown in FIG. 8B, the retaining strap 770 may retract into opening 726 via the retraction mechanism 725. In operation, a user may initiate retraction of the seatback 712 and/or the headrest 710, for example, by overcoming the retraction force of a stow strap force retracting mechanism housed within the seat back 712 (see, e.g., stow strap force retracting mechanism 142 of FIG. 3). Accordingly, when a user pulls stow strap 720 in direction 722, as shown in FIG. 6A, for example, the retraction mechanism 725 may impart a reactive force on the stow strap 720 via retaining strap 770 attached to the stow strap 720, without preventing a user from applying a sufficient pulling force to enable stowing of seatback 712 and/or headrest 710. When the pulling force on stow strap 720 is no longer applied, the stow strap 720 may be retracted via the stow strap retraction mechanism located within the seatback 712 (via opening 726), while the retaining strap 770 may also retract via retraction mechanism 725 in direction 721 causing the stow strap 720, upon retraction, to return to a rest position against the seatback rear surface 712b.

Figure 9A:
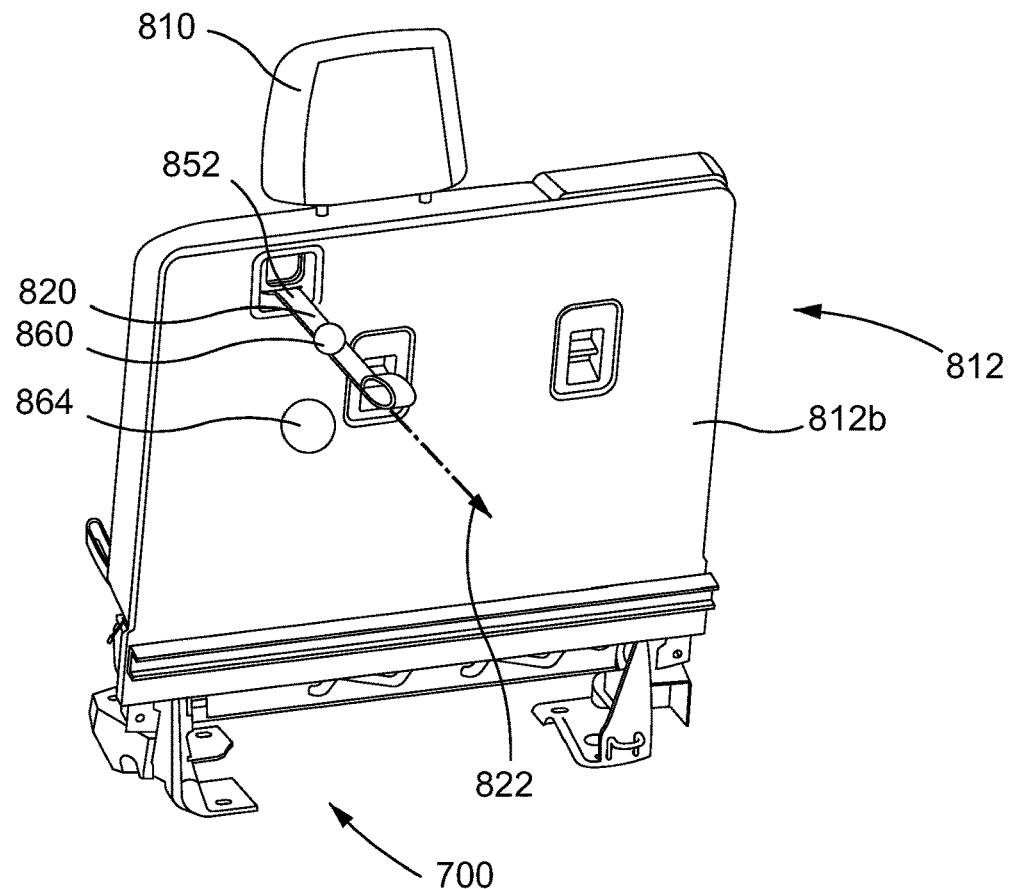
FIG. 9A is a side perspective view of a seatback and stow strap retention mechanism in accordance with one aspect of the disclosure.
Figure 9B:
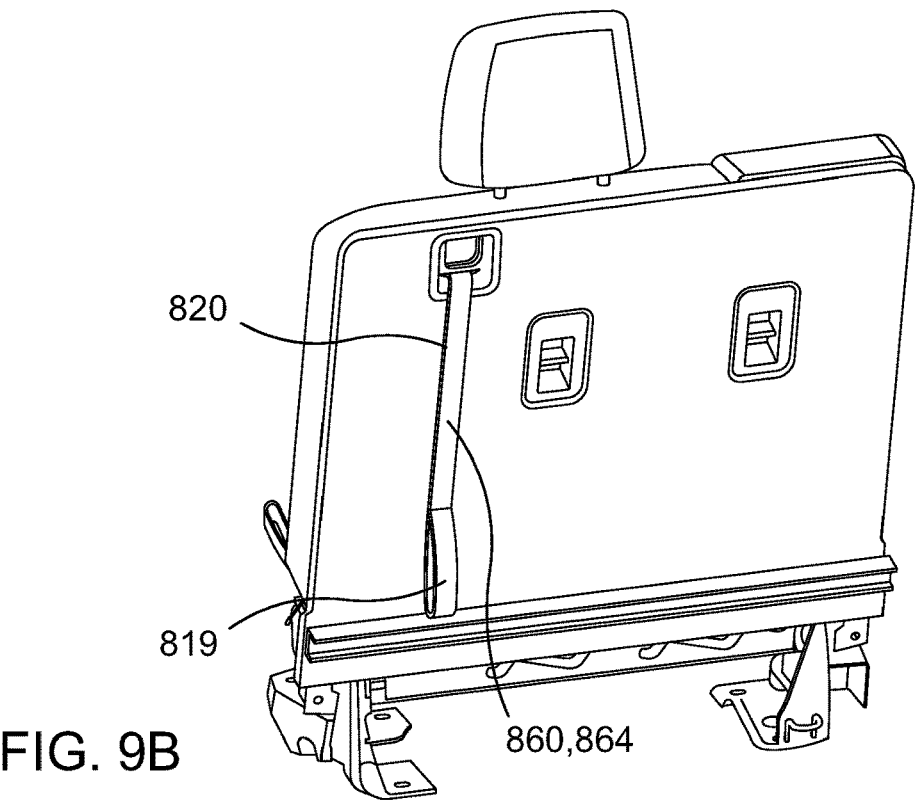
FIG. 9B is left side perspective view of a seatback and the stow the stow strap retention mechanism shown in FIG. 9A in accordance with one aspect of the disclosure.
Figure 9C:
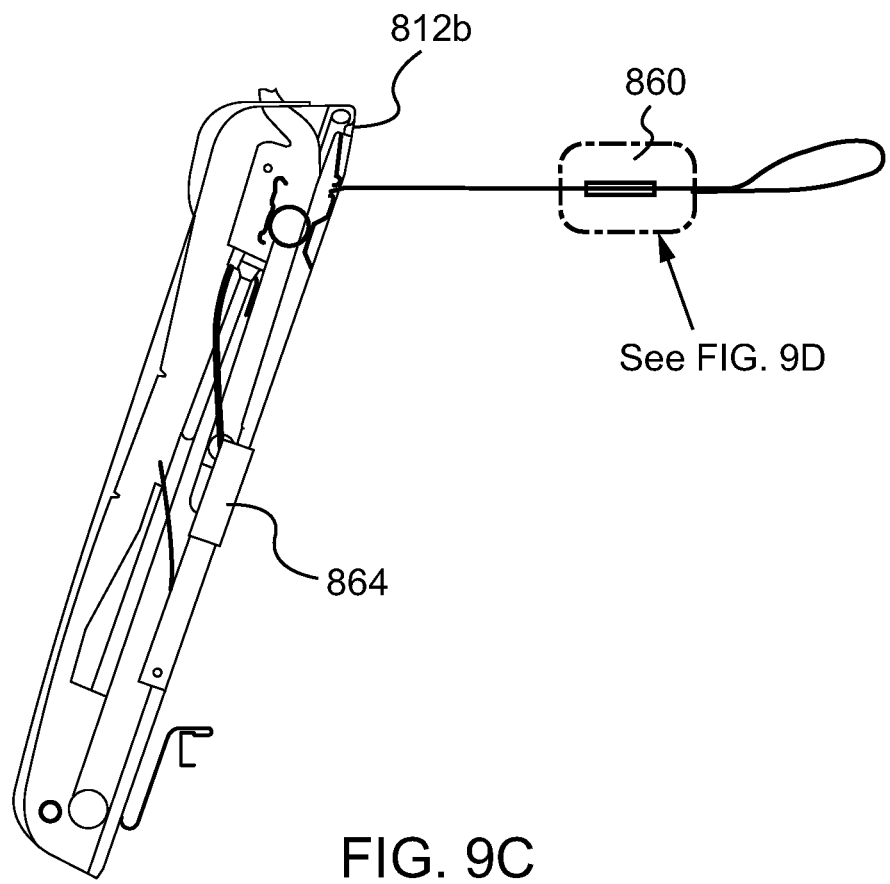
FIG. 9C is a side see-through view of a seatback and the stow the stow strap retention mechanism shown in FIGS. 9A-B in accordance with one aspect of the disclosure.
Figure 9D:
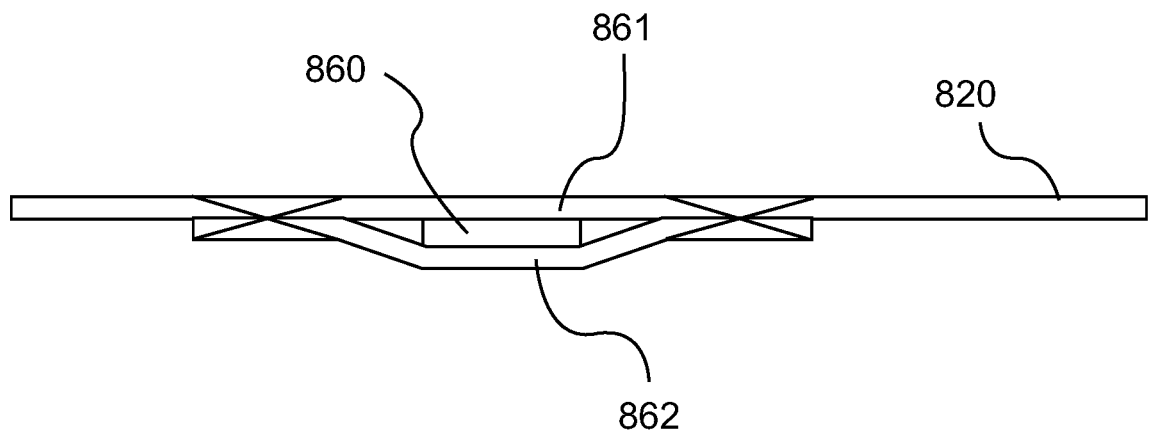
FIG. 9D is a side see-through enlarged view of the stow strap and the stow strap and a portion of the retention mechanism shown in FIG. 9C in accordance with one aspect of the disclosure.

FIGS. 9A and 9B show a side perspective view of a seatback and one example of a stow strap features and operation in accordance with one aspect of the disclosure. FIG. 9A shows a stow strap retention mechanism comprised of magnetic portion 864 connected to a seatback surface 812b. The stow strap 820 may include a magnetic element 860 connected to a portion of the stow strap. FIG. 9C shows a partial see-through side view of the seatback including the stow strap retention mechanism of FIGS. 9A and 9B. FIG. 9D shows a magnified portion of FIG. 9C. With reference to FIG. 9D, the stow strap 820 may include a magnetic element 860 sandwiched between layers of the stow strap 820. The stow strap may include a top portion 861 above the magnetic element and a bottom portion 862 below the magnetic element. The top portion 861 and bottom portion 862 may be joined to one another using any suitable features and/or methods. For example, the top and/or bottom portion may be riveted, sewed, bolted, screwed, welded using ultrasonic welding and/or friction welding, or any other method practical for connecting the bottom portion so that magnetic element 864 is contained within the stow strap 820. Further, the magnetic element 864 may be connected to the seatback surface 812b or to a rear of the seatback surface, and/or the seatback frame 150 (FIG. 3). Further, magnetic element 864 may be connected to any component of the seat using any suitable features and/or methods. For example, the magnetic element 864 may be joined to a surface by gluing, using rivets, it may be sewed into the seatback and/or fabric of the seatback, bolted, screwed, welded, brazed, or welded using ultrasonic welding and/or friction welding, for example. Magnetic element 864 may be any a suitable magnet. Some examples of suitable magnets include a single or plurality of magnets comprising a neodyum iron boron magnet, a samarium cobalt magnet, a ceramic magnet, a ferrite magnet, and/or a rare-earth magnet. In one aspect, the magnetic element 864 connected to the seatback surface 812b may be a magnet, and the magnetic element 860 connected to the stow strap 820 may be a magnetic metal (hereinafter interchangeably referred to as a ferrous metal). Further, in another aspect the magnetic element 864 connected to the seatback surface 812b may be a magnetic metal, and the magnetic element 860 connected to the stow strap 820 may be any type of magnet. In yet another aspect, the magnetic element 864 connected to the seatback surface 812b may be a magnet, and the magnetic element 860 connected to the stow strap 820 may be any type of magnet. In each of the examples discussed above, the magnetic element 864 of the seatback and/or the magnetic element 860 connected to the stow strap 820 may impart a magnetic attraction force on the other of the magnetic element 864 of the seatback and/or the magnetic element 860 connected to the stow strap 820 causing the stow strap 820 to return to a similar position with relation to the seatback surface 812b each time a user releases the stow strap 820 after imparting a pulling force on the stow strap 820. For example, with reference to FIGS. 9A and 9B, in operation, a user may initiate retraction of the seatback 812 and/or the headrest 810, for example, by overcoming the retraction force of a stow strap force retracting mechanism housed within the seatback 812 (see, e.g., stow strap force retracting mechanism 142 of FIG. 3). Once a user releases the stow strap 820, the magnetic elements 860 and 864 may cause the stow strap to return to return to desired position on the seatback as shown in FIG. 9B, for example. Accordingly, the stow strap retention mechanism causes the stow strap 820 to return to substantially the same position after a user pulls on the stow strap 820, while still allowing a user to apply a pulling force to the stow strap 820.

Figure 10A:
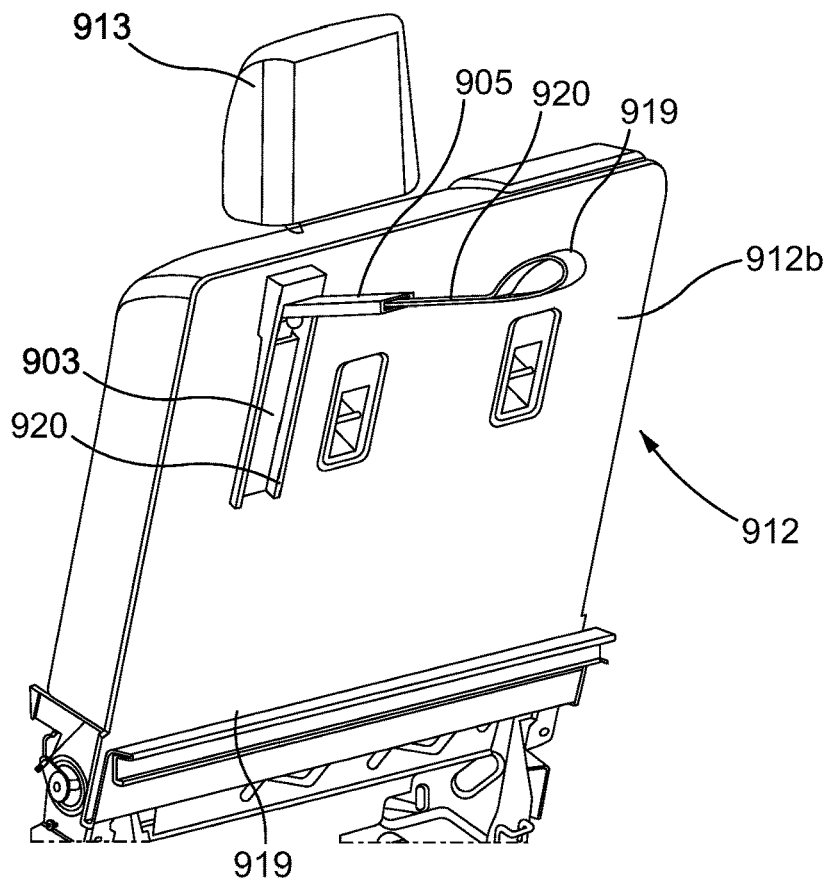
FIG. 10A is a side perspective view of a seatback and stow strap retention mechanism in accordance with one aspect of the disclosure.

FIGS. 10A-13B show one example of a stow strap retention mechanism in accordance with one aspect of the disclosure. FIGS. 10A-B show a rear perspective view of a seat having a seatback rear surface 912b. A stow strap 920 may be slidably retained within a hollow stow strap retention sleeve 905. The strap retention sleeve may have a first opening 937 and a second opening 938 (FIG. 11B) on each end of the retention sleeve with a hollow passageway passing from the first opening to the second opening. The hollow passageway may be dimensioned to receive the stow strap 920 so that the stow strap is slidably retained within the hollow passageway. The stow strap retention sleeve 905 may be mounted to a retention sleeve track 910 having a channel 903 within an outer track 901. The retention sleeve track may have a first end 990 and a second end 1001. The outer track 901 may extend beyond the seatback surface 912b in a Y direction. Further, the channel 903 may also extend beyond a seatback surface in the Y direction. The stow strap retention sleeve may be pivotally mounted to the retention sleeve track 910 and configured to pivot around an axis 906 (FIG. 11B). As shown in FIG. 10A, the stow strap 920 and stow strap retention sleeve 905 may be pivoted upward with relation to seatback surface 912b in direction 902 (FIG. 11B). The retention sleeve track may include a stopper portion 980 that prevents the stow strap retention sleeve 905 from over-rotating in direction 902. As shown in FIG. 10B, the stow strap 920 and stow strap retention sleeve 905 may be pivoted downward to a rest position. When the stow strap retention sleeve 905 is pivoted downward, the channel 903 of the retention sleeve track 910 is configured to receive and contact the stow strap retention sleeve 905. In one example, when the stow strap retention sleeve 905 is in contact with surface of channel 903, the outer track 901 may protrude further from a seatback surface 912b than the stow strap retention sleeve 905, which may function to protect the stow strap retention sleeve 905 and/or the stow strap 920 from contacting cargo or other objects that may contact the rear seatback surface 912b and/or the retention sleeve track 910. As an alternative to the aspects discussed above, the retention sleeve 905 may be fixedly mounted to the retention sleeve track 910. The retention sleeve 905 may be formed of an elastic or flexible material so that the retention sleeve may flex away from the retention sleeve track 910 without the need for a pivot.

Figure 10B:
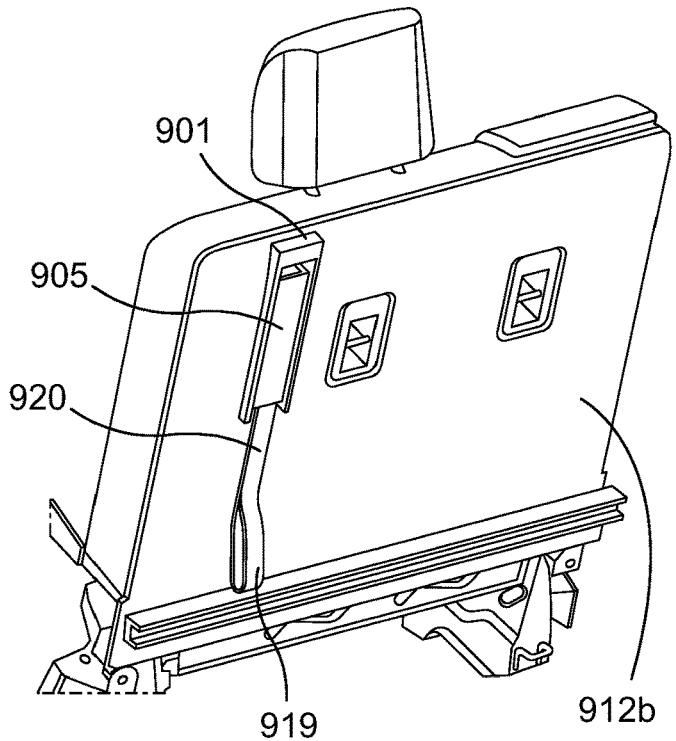
FIG. 10B is a side perspective view of a seatback and the stow the stow strap retention mechanism shown in FIG. 10A in accordance with one aspect of the disclosure.
Figure 11A:
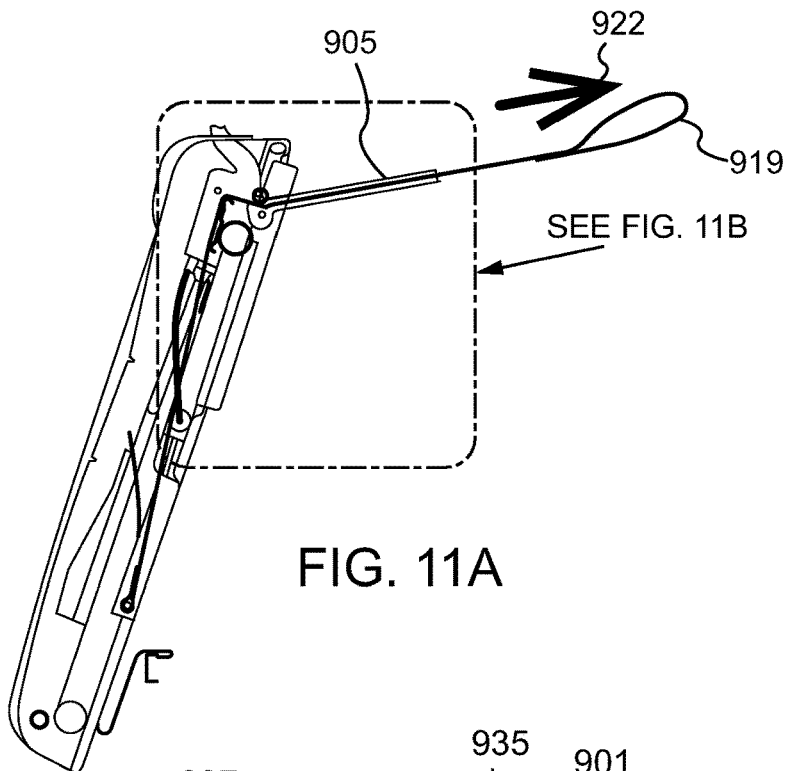
FIG. 11A is a side see-through view of a seatback and the stow the stow strap retention mechanism shown in FIGS. 10A-B in accordance with one aspect of the disclosure.
Figure 11B:
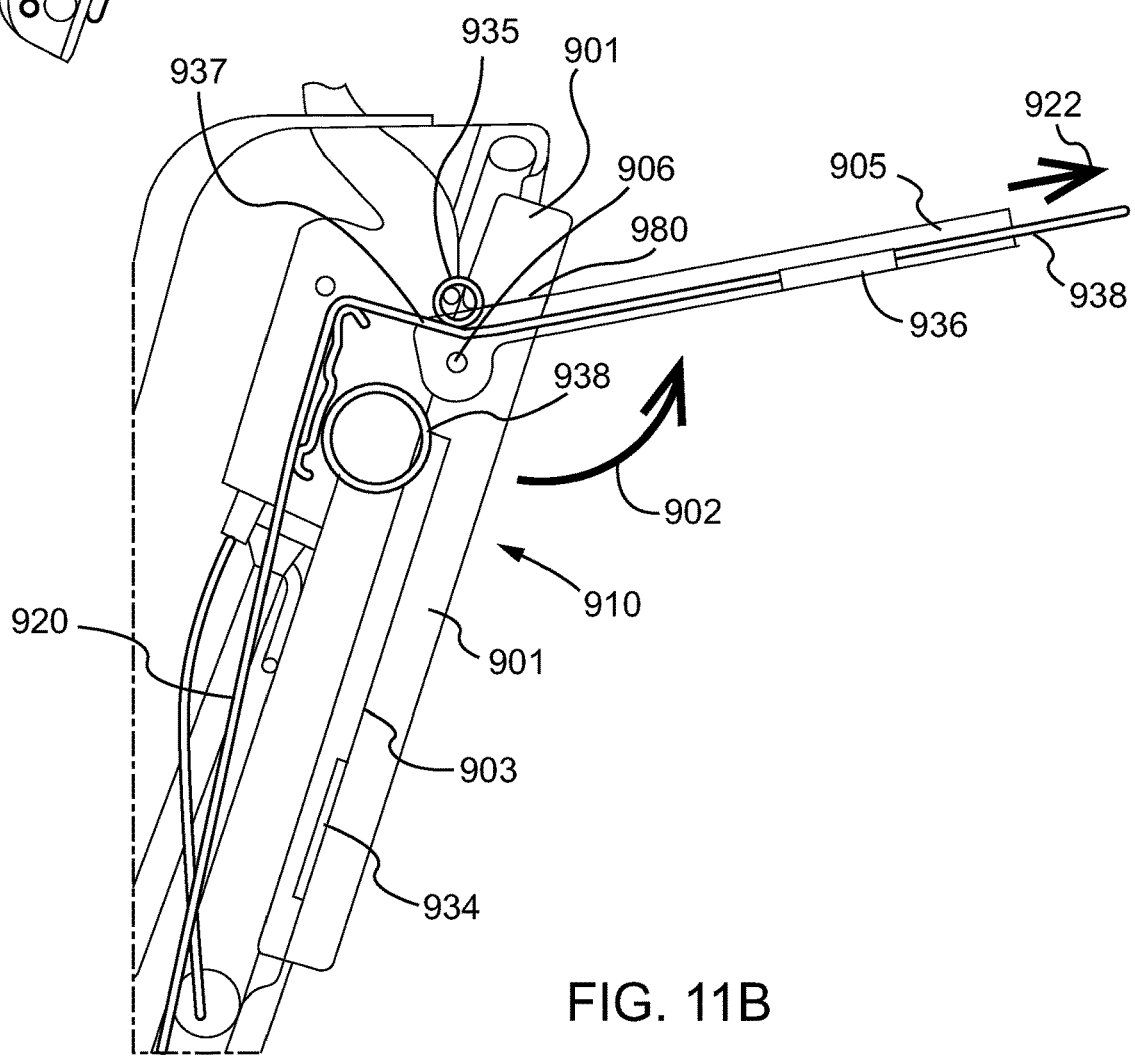
FIG. 11B is a side see-thorough enlarged view of the stow strap and the stow strap retention mechanism shown in FIG. 10A in accordance with one aspect of the disclosure.

FIGS. 11A and 11B are side see-through views of the seatback shown in FIGS. 10A and 10B. As shown in FIGS. 11A and 11B, the stow strap sleeve may have an opening 937 that faces the inner seatback when the stow strap 920 and stow strap retention sleeve 905 are rotated upward in direction 902. Further, the retention sleeve track 910 may include an opening 938 that is in communication with the inner seatback, allowing the stow strap 920 to pass therethrough via the stow strap retention sleeve opening 938. The stow strap 920 may pass through opening 937 and 938 and may be connected to stow strap force retracting mechanism 142 (FIG. 3).

Figures 12A, 12B:
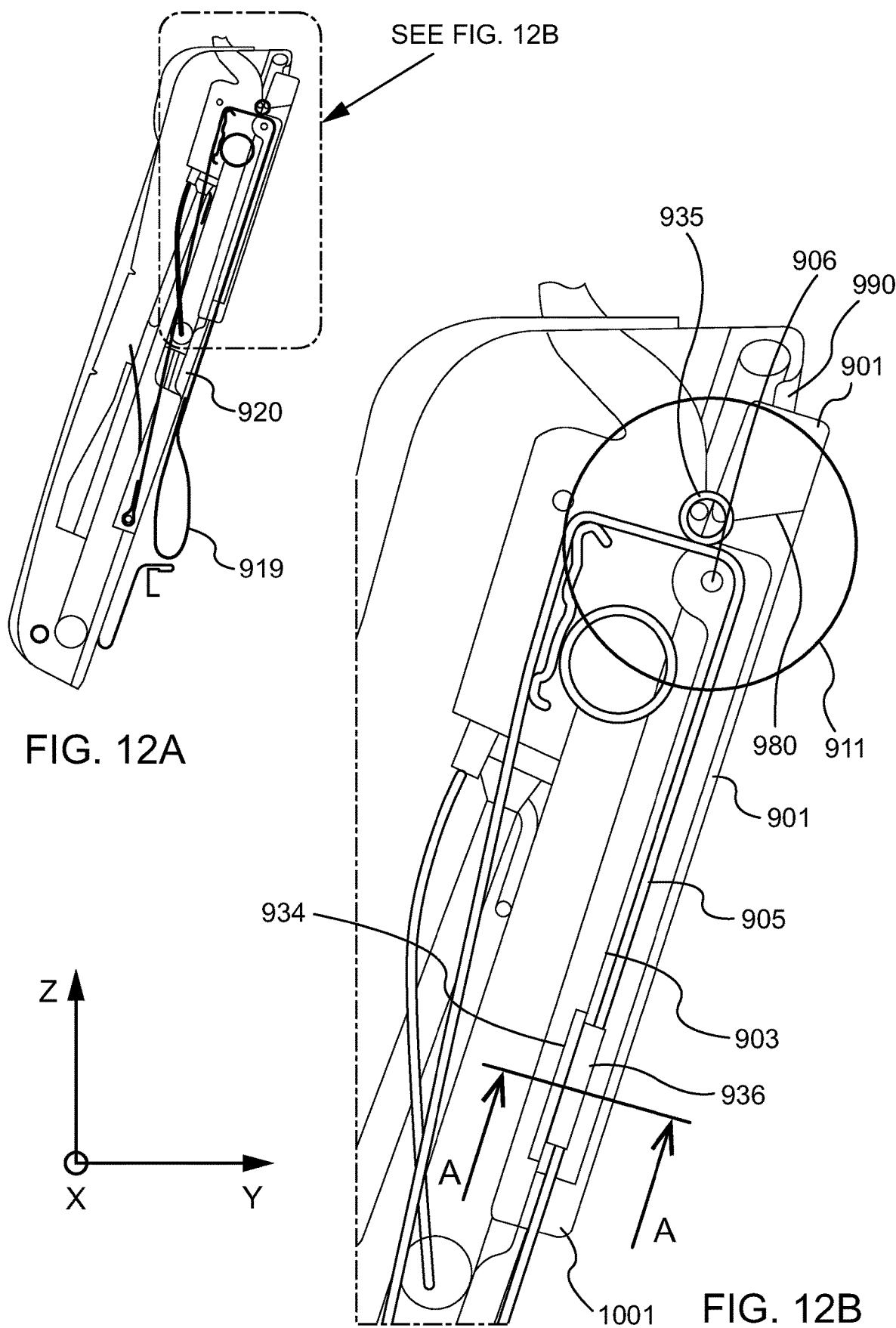
FIG. 12A is a side see-through view of a seatback and the stow the stow strap retention mechanism shown in FIGS. 10A-11B in accordance with one aspect of the disclosure.
FIG. 12B is a side see-through enlarged view of the stow strap and the stow strap retention mechanism shown in FIG. 12A in accordance with one aspect of the disclosure.

As discussed above, the stow strap retention sleeve 905 may be pivotally connected to the stow strap retention sleeve track 910. As shown in FIGS. 12A and 12B, the strap retention sleeve may be pivotally biased in direction 911 by a spring 935. The spring 935 shown in FIGS. 11A-12B is a torsion spring, however it is noted that any type of spring may be used, for example a compression spring, an extension spring, a tension spring, a leaf spring, and/or a clock spring may be used to name a few examples. The spring 935 may bias the retention sleeve track 910 in direction 911 so that the retention sleeve 905 contacts the retention sleeve track 910 when in a rest position. As best shown in FIG. 12B, when the retention sleeve 905 is in a rest position, a surface of the retention sleeve 905 may be in contact with the channel 903 of retention sleeve track 910. The outer track 901 may extend further beyond the seatback surface 912b than the retention sleeve 905 which may function to protect the stow strap retention sleeve 905 and/or the stow strap 920 from contacting cargo or other objects that may contact the rear seatback surface 912b and/or the retention sleeve track 910. Further, the retention sleeve track 910 may function as a sliding surface to reduce friction against a seatback surface when a seatback is in a folded position and cargo is loaded and/or slid onto the rear seatback surface.

Figure 13A:
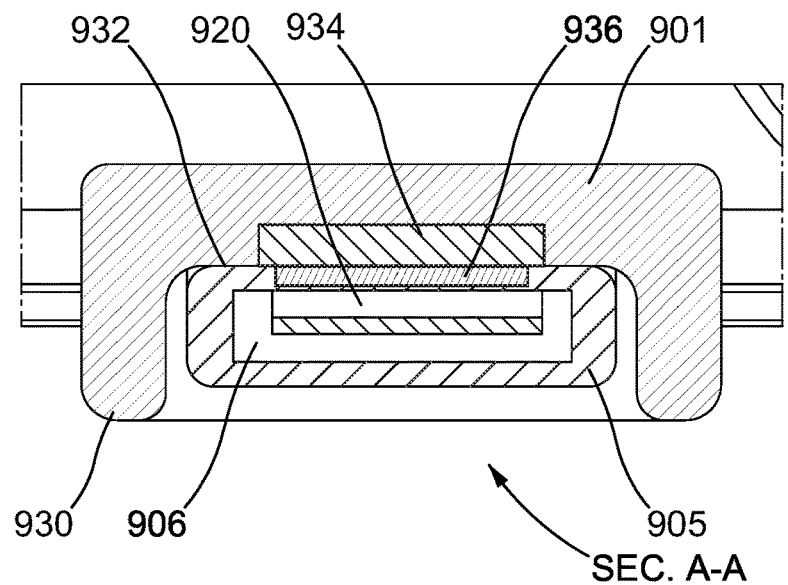
FIG. 13A is a see-through enlarged view of the stow strap and stow strap retention mechanism along section A-A in FIGS. 12B.

As shown in FIGS. 12B and 13A, the stow strap retention sleeve 905 may include a magnetic element 936 connected to a portion of the stow strap retention sleeve 905. The retention sleeve track 910, particularly the surface of channel 903 may include a magnetic element 934. Magnetic elements 934 and/or 936 may be connected to the retention sleeve track 910 and the stow strap retention sleeve 905 using any practical method of attachment. For example, the magnetic element(s) 934 and/or 936 may be joined to a surface by gluing, using rivets, bolted, screwed, welded, brazed, or welded using ultrasonic welding and/or friction welding, for example. In one aspect, the magnetic element 936 connected to the stow strap retention sleeve 905 may be a magnet, and the magnetic element 934 associated with the retention sleeve track 910 may be a magnetic metal. Further, in another aspect, to the magnetic element 936 connected to the stow strap retention sleeve 905 may be a magnetic metal, and the magnetic element 934 connected to the retention sleeve track 910 may be any type of magnet. In yet another aspect, the magnetic element 936 connected to the stow strap retention sleeve 905 may be a magnet with a first pole facing towards the retention sleeve track, and the magnetic element 934 connected to the retention sleeve track 910 may be a magnet or plurality of magnets having a second pole that is opposite the first pole facing the retention sleeve track 910. The magnetic element 934 and/or 936 may be any type of magnet. For example the magnetic element 934 and/or 936 may be a single or a plurality of magnets comprising a neodyum iron boron magnet, a samarium cobalt magnet, a ceramic magnet, a ferrite magnet, and/or a rare-earth magnet. In each of the examples discussed above, the magnetic element 936 stow strap retention sleeve 905 and the magnetic element 934 connected to the retention sleeve track 910 may impart a magnetic attraction force which causes stow strap retention sleeve 905 to return to a similar position each time a user releases the stow strap 920 after imparting a pulling force on the stow strap 920. In operation, a user may initiate retraction of the seatback 912 and/or the headrest 913, for example, by overcoming the retraction force of a stow strap force retracting mechanism housed within the seatback 612 (see, e.g., stow strap force retracting mechanism 142 of FIG. 3).

As shown in FIGS. 11A and 11B, a user may pull on stow strap 920 in direction 922 to impart a force on the stow strap force retracting mechanism 142 (FIG. 3). Once a user releases the stow strap 920, the magnetic elements 934 and 936 may cause the stow strap retention sleeve track 910 to return to return to desired position in the retention sleeve track 910 as shown in FIG. 12B for example. Further, in another aspect, once a user releases the stow strap 920, the spring 935 may cause the stow strap to return in direction 911 in FIG. 12B, and the magnetic elements 934 and 936 may further cause the stow strap retention sleeve 905 return to desired position in the retention sleeve track as shown in FIG. 12B for example. Accordingly, the stow strap retention sleeve guides the stow strap 920 and causes the stow strap 920 to return to substantially the same position with relation to a seatback rear surface 912b after a user pulls on the stow strap 920, while still allowing a user to apply a pulling force to the stow strap 920.

Figure 13B:
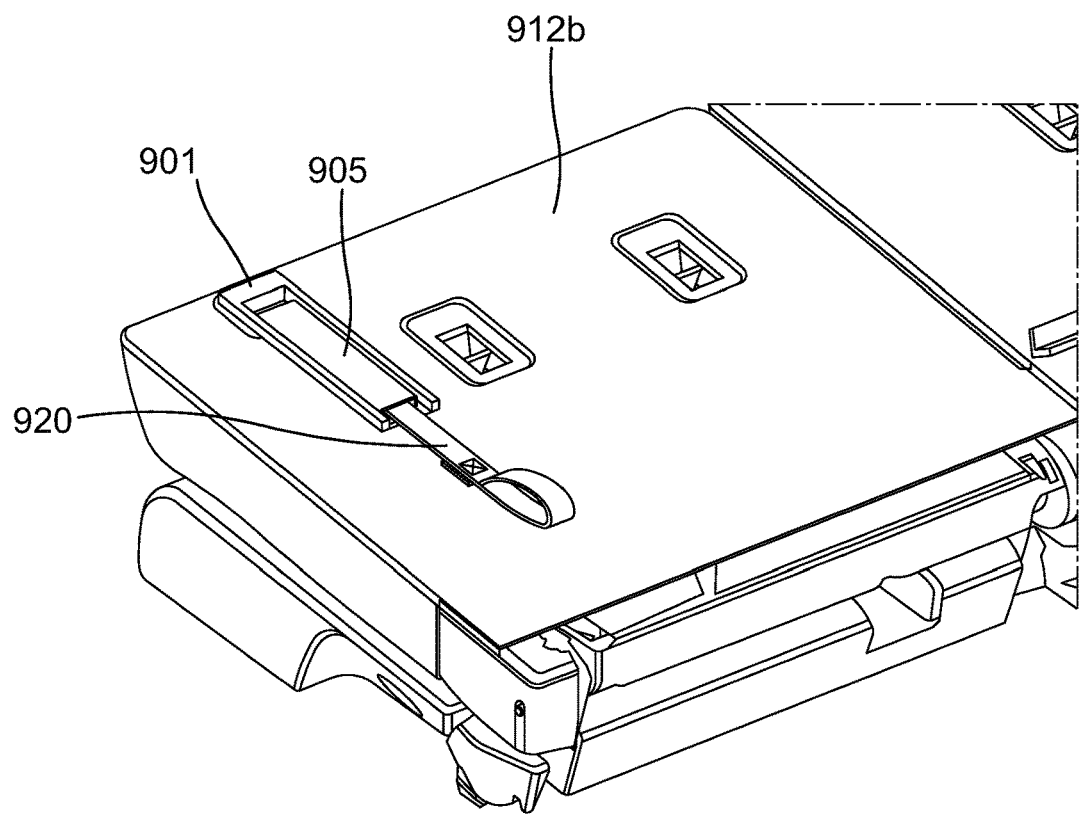
FIG. 13B is a side perspective view of a folded seat with the stow strap and stow strap retention mechanism shown in FIGS. 10A-13A in accordance with one aspect of the disclosure.

FIG. 13B is a side perspective view of a folded seat, that may be a split seat. Each of the seats may have a stow strap 920 and stow strap retention mechanism as described above. As shown in FIG. 13B, when the seats are in a stowed or folded position, the stow strap retention mechanism pulls the stow strap 920 against the seatback rear surface. Further, the outer track 901 may function to protect the seatback rear surface 912b and/or the stow strap retention sleeve 905 and/or the stow strap 920.

The foregoing description of various aspects and examples have been presented for purposes of illustration and description. It is not intended to be exhaustive nor to limit the disclosure to the forms described. The aspects(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A stow strap retention mechanism, comprising:
   a retention sleeve having a channel therein extending from a first opening at a first end of the retention sleeve to a second opening at a second end of the retention sleeve, wherein the channel is configured to receive and guide a stow strap;
   a retention sleeve track extending in a first direction from a first track end to a second track end, wherein the retention sleeve is extendably mounted to the retention sleeve track at a mounting location, the mounting location being located closer to the first track end than the second track end; and
   a biasing element, wherein the biasing element biases the retention sleeve to pivot in a first radial direction towards the retention sleeve track.

2. The stow strap retention mechanism of claim 1, wherein the retention sleeve is pivotally mounted to the retention sleeve at the mounting location.

3. The stow strap retention mechanism of claim 1, wherein the retention sleeve track further comprises a first magnetic element.

4. The stow strap retention mechanism of claim 2, wherein the retention sleeve further comprises a second magnetic element, wherein when the retention sleeve is moved towards the retention sleeve track about the mounting location, the first magnetic element and the second magnetic element are attracted to one another via a magnetic force imparted by at least one of the first magnetic element and the second magnetic element.

5. The stow strap retention mechanism of claim 1, wherein the retention sleeve track further comprises:
   a first outer track portion having a first dimension along a second direction that is substantially perpendicular to a first direction;
   a second outer track portion having a second dimension along the second direction; and
   a channel between first and second outer track portions, wherein the channel has a dimension in the second direction that is less than the first dimension and the second dimension.

6. The stow strap retention mechanism of claim 1, wherein the retention sleeve track is mounted to a seatback surface, wherein the first outer track portion and the second outer track portion protrude from the seatback in a second direction, wherein when the retention sleeve is in contact with the channel of the retention sleeve track, the first and second outer track portions protrude further from a seatback in the second direction that the retention sleeve.

7. The stow strap retention mechanism of claim 2, wherein the retention sleeve track further comprises a stopper portion proximal to the mounting, where the stopper contacts the retention sleeve to prevent the retention sleeve from rotating past a certain point in a second direction opposite the first direction.

8. A stowable seat comprising:
a frame;
a seatback attached to the frame, the seatback having an interior portion, an outer surface and an opening in the outer surface, the opening communicating with the interior portion;
a stow strap retracting mechanism housed at least partially within the interior portion of the seatback;
a stow strap interoperable with the stow strap retracting mechanism, wherein a variable portion of the stow strap extends from the interior portion of the seatback through the opening in the outer surface of the seatback, wherein the portion of the stow strap that is extended from the opening varies between a seat unstowed portion length and a seat stowed portion length, wherein when in a seat stowed portion length, the stow strap imparts a force in a first direction on the stow strap retracting mechanism;
a stow strap retaining feature, wherein the stow strap retaining feature biasedly retains the variable portion of the stow strap extending from the opening in the seatback.

9. The stowable seat of claim 8, wherein the stow strap retaining portion biasedly retains the variable portion of the stow strap by providing a reactive force in a return direction, wherein the return direction is not the same as the first direction.

10. The stowable seat of claim 8, wherein when the stow strap is pulled to extend the strap to a seat stowed portion length, the stow strap imparts a force in the first direction to the retracting mechanism, wherein when the stow strap is pulled, the retracting mechanism imparts a reactive force in a second direction that is substantially opposite the first direction.

11. The stowable seat of claim 8, further comprising:
a headrest folding mechanism; and
a seatback folding mechanism, wherein the headrest folding mechanism and the seatback folding mechanism are intraoperatively connected to the retracting mechanism, wherein pulling the stow strap engages the retracting mechanism and the seatback folding mechanism causing the seatback to fold.

12. The stowable seat of claim 8, wherein the stow strap retaining feature comprises:
an elastic band connected to the outer surface of the seatback at a first location and a second location distal from the first location, wherein the stow strap is capable of being contained between the elastic band and the outer seatback surface, and between the first location and the second location.

13. The stowable seat of claim 8, wherein the stow strap retaining feature comprises:
an elastic band having a first end and a second end, wherein the first end is connected to the outer seatback surface and the second end is connected to the stow strap.

14. The stowable seat of claim 8, wherein the stow strap retaining feature comprises:

a retracting strap having a first end connected to retracting strap retention mechanism and a second end connected to the stow strap, wherein the retracting strap retention mechanism is capable of retracting the retracting strap so that the stow strap is pulled toward the outer surface of the seat.

15. The stowable seat of claim 14, wherein the retracting strap retention mechanism is within the inner seat, wherein the retracting strap passes through opening in the outer surface of the seat.

16. The stowable seat of claim 8, wherein the stow strap retaining feature further comprises:
at least one of magnet and ferrous metal mounted to a first portion of the outer surface of the seat;
at least one of a magnet and a ferrous metal mounted to a first portion of the stow strap, wherein the first portion of the stow strap is magnetically attracted to the first portion of the outer surface of the seat.

17. The stowable seat of claim 8, wherein the stow strap retaining feature comprises:
a hollow strap guide pivotally mounted a portion of the outer rear surface of the seat, wherein at least a portion of the stow strap is slidably contained within the hollow strap guide;
a strap guide biasing member for biasing the strap guide towards the outer rear surface of the seat;
a strap guide track, wherein the strap guide strap is dimensioned to receive the strap guide when the strap guide is biased towards the outer rear surface of the seat.

18. The stowable seat of claim 17, wherein at least a portion of the hollow strap guide includes at least one of magnet and ferrous metal, wherein at least a portion of the strap guide strap comprises at least the other one of a magnet and a ferrous metal, wherein the portion of the hollow strap guide is magnetically attracted to the portion of the strap guide track.

19. A stowable seat comprising:
a frame;
a seatback attached to the frame, the seatback having an interior portion, an outer surface and an opening in the outer surface, the opening communicating with the interior portion;
a stow strap retracting mechanism housed at least partially within the interior portion of the seatback;
a seat stowing mechanism housed at least partially within the inner seat;
a stow strap interoperable with the stow strap retracting mechanism, wherein the stow strap passes from the interior portion to the outer rear seatback surface of the seat through an opening in the outer rear seatback of the seat, wherein pulling the stow strap imparts a force in a first direction on the seat stowing mechanism; and
a stow strap retention mechanism comprising:
a retention sleeve having a channel therein extending from a first opening at a first end of the retention sleeve to a second opening at a second end of the retention sleeve, wherein the channel is configured to receive and guide a stow strap;
a retention sleeve track extending in a first direction from a first track end to a second track end, wherein the retention sleeve is extendably mounted to the retention sleeve track at a mounting location, the mounting location being located closer to the first track end than the second track end.

20. The stowable seat of claim 19, wherein the retention sleeve is pivotally mounted to the retention sleeve at the mounting location.

* * * * *